United States Patent
Rabhi

(10) Patent No.: US 10,116,122 B2
(45) Date of Patent: Oct. 30, 2018

(54) SPARK PLUG WITH SHUTTLE ELECTRODE

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 0 days.

(21) Appl. No.: 15/835,489

(22) Filed: Dec. 8, 2017

(65) Prior Publication Data

US 2018/0166862 A1 Jun. 14, 2018

Related U.S. Application Data

(60) Provisional application No. 62/432,088, filed on Dec. 9, 2016.

(51) Int. Cl.
| | | |
|---|---|---|
| *F02P 23/00* | (2006.01) | |
| *H01T 13/24* | (2006.01) | |
| *F02P 15/00* | (2006.01) | |
| *F02B 19/10* | (2006.01) | |
| *H01T 13/34* | (2006.01) | |
| *H01T 13/54* | (2006.01) | |
| *H01T 13/38* | (2006.01) | |
| *F02B 1/04* | (2006.01) | |

(52) U.S. Cl.
CPC .......... *H01T 13/24* (2013.01); *F02B 19/1004* (2013.01); *F02P 15/001* (2013.01); *H01T 13/34* (2013.01); *H01T 13/38* (2013.01); *H01T 13/54* (2013.01); *F02B 1/04* (2013.01)

(58) Field of Classification Search
CPC .......... F02P 13/00; F02P 15/00; H01T 13/08; H01T 13/40; H01T 13/20; H01T 13/32; H01T 13/24; H01T 13/26
USPC .......... 123/143 R, 169 R, 169 CA, 169 EL, 123/169 EA; 313/136
See application file for complete search history.

(56) References Cited

U.S. PATENT DOCUMENTS

| | | | | |
|---|---|---|---|---|
| 2009/0127996 A1* | 5/2009 | Passman | ................. | H01T 13/39 |
| | | | | 313/136 |
| 2010/0084391 A1* | 4/2010 | Nakayama | ............. | H01T 13/32 |
| | | | | 219/270 |
| 2010/0206256 A1* | 8/2010 | Kishimoto | ............. | H01T 13/34 |
| | | | | 123/169 E |
| 2015/0114332 A1* | 4/2015 | Stifel | ...................... | F02P 23/04 |
| | | | | 123/143 B |
| 2016/0079739 A1* | 3/2016 | Okazaki | ................. | H01T 13/20 |
| | | | | 313/143 |
| 2016/0087411 A1* | 3/2016 | Sakakura | ................ | H01T 13/32 |
| | | | | 313/141 |
| 2017/0170636 A1* | 6/2017 | Niessner | ................ | H01T 13/32 |

\* cited by examiner

*Primary Examiner* — John Kwon
(74) *Attorney, Agent, or Firm* — Young & Thompson

(57) ABSTRACT

A spark plug with shuttle electrode is provided for an internal combustion engine which includes a combustion chamber in which a main charge diluted with a neutral gas is ignited, the spark plug housing a lamination cavity in which a central electrode opens and in which a lamination injector is able to inject under pressure a pilot charge consisting of an easily flammable combustive-AF fuel mixture, the cavity being connected to the combustion chamber by a lamination duct, while a shuttle electrode is interposed between the central electrode and a ground electrode and can translate in the lamination duct.

20 Claims, 13 Drawing Sheets

SPARK PLUG WITH SHUTTLE ELECTRODE

The subject of the present invention is a spark plug with a shuttle electrode which allows igniting a main charge introduced into the combustion chamber of an internal combustion engine either by means of a spark alone or by means of a well-known pilot charge and ignited by a spark, said spark plug being designed to optimize the efficiency of said pilot charge to ignite said main charge.

The maximum and average efficiency of reciprocating internal combustion engines according to the state of the art is relatively low. In automobiles, the maximum efficiency is of the order of thirty-five per cent for Otto-cycle positive-ignition engines, and of the order of forty per cent for Diesel cycle engines. With regard to the currently average efficiency of automotive engines, it is most often less than twenty percent for positive-ignition engines, and twenty-five percent for Diesel engines.

In said engines, the fraction of the energy which is released by the combustion of the fuel and which is not converted into useful work is mainly dissipated in the form of heat in the cooling system and at the exhaust of said engines.

In addition to poor efficiency, reciprocating internal combustion engines used in automobiles produce polluting gases and particles that are harmful to the environment and to health.

Despite these disadvantageous features, for lack of other solutions offering a better energy, environmental, functional, and economic compromise, Otto or Diesel cycle internal combustion engines are installed on almost all the motor vehicles in circulation in the world.

This situation explains the significant efforts made in research and development by engine manufacturers to improve by all means the energy and environmental balance of internal combustion engines. These efforts are intended in particular to perfect the technologies used to build such engines, and to supplement them with new features that will allow the implementation of new strategies.

Among these strategies is the dilution of the air and fuel charge of the reciprocating internal combustion engines with either neutral gas or fresh air rich in oxygen.

The present invention is focused on such dilution and is particularly intended for reciprocating internal combustion engines with positive ignition that most often consume either gasoline or natural gas.

Diluting the charge of positive-ignition engines with fresh air or with previously cooled exhaust gases allows increasing the average and/or maximum thermodynamic efficiency of said engines. This results in reduced fuel consumption for the same amount of work produced.

When positive-ignition engines operate in partial torque, introducing a diluted charge into their cylinder(s) produces less pumping losses than introducing an undiluted charge. The reduction of said losses is due to the fact that the diluted charge has a larger volume with the same energy content. Thus, to introduce the same amount of energy into said cylinder(s), the throttling on admission of said engines usually made by means of a throttle valve is less pronounced, and the pressure of the gases that occur at said intake is higher.

In addition, with the same energy introduced into the cylinder(s) of positive-ignition engines, diluting the charge increases the mass and the total heat capacity of the latter. Thus, all things being equal, the combustion of said charge takes place at a lower temperature. In addition to reducing the amount of nitrogen oxides produced by the combustion, said low temperature reduces the thermal losses at the walls of the cylinder(s) which result from the transfer by said charge of part of its heat to said walls.

Finally, if the charge is, in particular, diluted with a neutral gas that is low in oxygen or even free of oxygen, the said charge is less sensitive to the uncontrolled self-ignition of the air-fuel mixture. This self-ignition is responsible for rattling, an undesirable phenomenon characterized by a detonating combustion that deteriorates the efficiency of the positive-ignition engines and damages their mechanical components. The desensitization to rattling that is provided by the dilution of the charge allows said engines to either operate at a higher compression ratio, or to operate with ignition that is triggered at the most favorable time possible to enhance the efficiency, or both.

In this particular context of diluted air and fuel charges, there are positive-ignition engines operating on stoichiometric mixtures, said engines operating in excess air also called "lean mixture".

The engines operating on stoichiometric mixtures are only compatible with a three-way catalytic converter, a well-known apparatus which post-processes the pollutants resulting from combustion. Said catalytic converter is responsible for burning the hydrocarbons that have not been burnt in the combustion chamber of the thermal engine. The products of this combustion are water vapor and carbon dioxide already present in the atmosphere. The said three-way catalytic converter also completes the oxidation of the notoriously polluting carbon monoxide to also convert it to carbon dioxide, and reduces the nitrogen oxides to the atmospheric dinitrogen which constitutes about seventy-eight percent of the terrestrial atmosphere, and which is, by nature, non-polluting.

The reduction of nitrogen oxides by three-way catalysis requires that the charge introduced into the engine be stoichiometric, that is to say that it contains the right amount of oxygen necessary for the combustion of the hydrocarbons contained in said charge.

An excess of oxygen makes it impossible to reduce the nitrogen oxides by the three-way catalytic converter. It is therefore not possible to post-process the nitrogen oxides contained in the exhaust gases of engines operating in excess air by means of a three-way catalytic converter.

This explains why—in order to meet the ever more stringent environmental regulations—engines operating in excess air are now equipped with a device specifically designed to reduce nitrogen oxides, such as a nitrogen oxide trap or some type of catalytic device for the selective reduction of nitrogen oxides to urea. Such device is generally placed at the outlet of a two-way oxidation catalytic converter which has previously burnt the unburnt hydrocarbons and which has completed the oxidation of carbon monoxide, and more and more often, of a particulate filter.

Since the entry into force of the Euro VI standard in Europe, given that diesel engines operate naturally in excess air, almost all European diesel cars are equipped with a device that post-processes nitrogen oxides to transform them into dinitrogen.

The problem of these devices is that they are expensive, complex, and that their size and maintenance constraints are high to the point that said devices are almost exclusively used on diesel engines that can, in practice, operate only in excess air.

As far as positive-ignition engines are concerned, engine manufacturers strive by all means to make them work with stoichiometric mixtures so that they remain compatible with three-way catalytic converters, which are basically simple and inexpensive.

To benefit from the reduction in fuel consumption induced by the dilution of the charge of the positive-ignition engines without having to suffer the particular economic drawbacks of a nitrogen oxide trap or a catalytic device for the selective reduction of nitrogen oxides to urea, it is therefore necessary to dilute said charge of said engines, not with air rich in oxygen, but with a neutral gas devoid of oxygen.

This latter gas is usually supplied by the recycling of the exhaust gases of the engine itself, said gases no longer containing oxygen and being available and abundant. This strategy is known as "Exhaust Gas Recirculation" and more precisely under the acronym "EGR".

Said gas exiting at high temperature at the exhaust of the positive-ignition engine, it is necessary to reduce their temperature before mixing them with the fresh gas in order to prevent them from overheating the charge introduced into said engine.

This strategy is known as "Cooled EGR", which entails that the recirculated exhaust gases are cooled prior to mixing them with the fresh gas received by said engine. The term is used by French motorists in the "Franglais" form of "EGR refroidi".

Prior cooling of the EGR gases is required for at least two purposes.

First, the temperature of the EGR-gas/fresh-gas mixture consumed by the positive-ignition engine must remain low so that the volumetric efficiency of said engine remains high when operating at full torque. Indeed, for a given intake pressure, the mass of said mixture introduced into the cylinder(s) of said engine is all the more important that said mixture is cold. The pre-cooling of the EGR gases is made even more essential if said engine is supercharged by a turbocharger or by any other means.

Secondly, the hotter the EGR-gas/fresh-gas mixture, the more it promotes the occurrence of rattling which is detrimental to the efficiency of said engine.

The problem is that the charge diluted with cooled EGR is low in oxygen. This is paradoxical since it is also the goal sought in particular for the charge to remain stoichiometric and resistant to rattling. This oxygen depletion makes the initialization of the combustion more difficult to achieve and the development of said combustion slower than when said charge is not diluted with cooled EGR.

In a positive-ignition engine, the initialization of the combustion takes place by creating a high-temperature electric arc between two electrodes positioned a few tenths of a millimeter from each other.

When the air-fuel charge is heavily diluted with cooled EGR, the electric arc passes through a mixture globally poor in oxygen and fuel. The risk of a misfire increases if, by accident, the space of a few tenths of a millimeter separating the cathode from the anode of the spark plug does not contain an EGR-gas/fresh-gas mixture sufficiently burnable because, indeed, heterogeneities are inevitably created in the three-dimensional space of the combustion chamber, with pockets richer in oxygen and/or fuel than others.

If the combustion is initialized as desired, the fuel energy contained in the charge begins to release as heat and the flame begins to develop. To do this, said flame communicates its heat to the surrounding EGR-gas/fresh-gas mixture by successive approaches, burnable layer after burnable layer. Each layer is brought to its ignition temperature by the previous layer, burns, and releases heat that it communicates to the next layer and so on. According to the principle of the chain reaction, the flame propagates in the three-dimensional space of the combustion chamber of the positive-ignition engine.

The main problem of the cooled EGR is that it makes the initialization of combustion difficult, and then considerably slows the development of the latter, both because of the overall reduction of its temperature, and because of the heterogeneities of content in combustive and/or fuel found in the volume of the combustion chamber and therefore, on the path of the flame.

Moreover, experiments show that the higher the cooled EGR charge content, the more unstable the engine becomes. From a certain content, misfires occur and the efficiency—which until now had tended to increase with the cooled EGR content of the charge—decreases. Beyond a certain content in said EGR, the positive-ignition motor stops, the combustion not being able to initialize itself.

It is also observed that the unburnt hydrocarbon and carbon monoxide content of the exhaust gases increases in parallel with the cooled EGR content of the charge. This is due to both pockets of mixture too poor to burn properly encountered by the flame on its path, and the thickening of the boundary layer of flame entrapment near the cold internal walls of the combustion chamber of the engine.

Experiments also show that the higher the ignition power, the more it is possible to increase the cooled EGR content of the charge without greatly affecting the stability of the engine.

As such, many research laboratories—such as the "Southwest Research Institute" in the United States—have developed electric ignition devices increasingly powerful so as to push the accessible limits of cooled EGR content of the charge. The purpose of this strategy is, of course, to improve the efficiency of the positive-ignition engine.

The problem of leapfrogging in the search for power of electric ignitions is that their performance decreases rapidly with their power. More electrical power is needed to get less and less additional ignition power.

In addition, a high electrical power is of interest only if the electrodes are moved away from the spark plug to give more chances to the spark to cross a burnable pocket, or if the duration of the spark is increased, or if the spark reoccurs. This leads to increasingly high voltages and electrical powers which make it more complicated to achieve the electrical insulation of the spark plug while drastically reducing the life of the spark plug. The difficulty in igniting the charge also stems from the fact that the cooled EGR is all the more interesting on supercharged positive-ignition engines whose sensitivity to rattling is sought to be reduced by all means. However, the higher the supercharging pressure is, the more important the density of the EGR-gas/fresh-gas mixture is between the electrodes of the spark plug at the moment of the spark induction, and the higher the voltage required to induce said spark.

From this point of view, the cooled EGR does not go in the right direction because with the same energy introduced into the cylinder of the engine, the mass of gas which is between the electrodes increases as does the resistance of said gas to self-ignition.

It should be noted that Patent FR 2 986 564 belonging to the applicant is a solid response to these problems. The spark ignition and high-pressure lamination device for an internal combustion engine referred to in said patent proposes to inject under high pressure, in the center of the spark plug, and shortly before the spark is triggered, an approximately stoichiometric pilot charge, highly burnable because undiluted with cooled EGR, and potentially slightly rich in fuel.

Once injected by said device, said pilot charge bathing the electrodes of the spark plug, as soon as an electric arc is formed between said electrodes, said charge ignites immediately and releases the energy it contains. Thus, said charge constitute itself the ignition means whose power is several hundred to several thousand times greater than that of the electric arc that allowed to ignite it. It is practically impossible to obtain such ignition power with electric means alone.

Experience has shown that cooled EGR rates of the order of fifty percent are possible with such a device compared to rates of the order of thirty percent only with the single most powerful electric ignition devices that are available.

It should be noted that the approach adopted in Patent No. FR 2 986 564 is found in related forms in U.S. Pat. No. 4,319,552 of the inventors Fred N. Sauer and J. Brian Barry, or in Patent No. DE 41 40 962 A1 belonging to the Bosch Company.

In any event, U.S. Pat. No. 6,564,770 of the Orbital Company does not fall into this category because its object is, according to its description, to ensure, at relatively low pressure, the constitution of a main charge as homogeneous as possible, and not to provide a pilot charge for ignition of a main charge highly diluted with EGR.

The problem of the device described by the Patent No. FR 2 986 564 and in related patents as they have just been listed, is not in the initialization of the combustion which is very efficient, but in the development of said combustion. In particular, when the burnt fraction of the fuel contained in the main charge reaches about fifty percent, the combustion hardly progresses so that the total time required to burn the entire main charge is greater than the time required to burn an entire main charge undiluted with cooled EGR.

As a result, part of the potential energy gain of the cooled EGR is lost due to a combustion that develops too slowly.

However, the maximum benefit of the cooled EGR would be found if it were possible to operate a positive-ignition engine simultaneously with a main charge whose cooled EGR content is of the order of fifty percent on the one hand, and, on the other hand, with a stability and a total duration of combustion comparable to those found on the same said engine when the latter burns an undiluted charge.

The solution could come from the use of a prechamber into which the pilot charge would be introduced, said prechamber being able to house the electrodes of the spark plug and even to form an integral part of said spark plug, as proposed in U.S. Pat. No. 4,319,552.

The first advantage of such a prechamber is that it potentially maintains the pilot charge as close as possible to the electrodes of the spark plug, which can limit the dispersion of said charge in the main combustion chamber of the positive-ignition motor before the ignition of said charge.

The second advantage of said prechamber is that, once ignited, the pilot charge pressurizes said prechamber which sends flaming gas torches at high speed into the main combustion chamber of the positive-ignition engine via orifices comprised in said prechamber.

This ignition of the main charge by means of torches is very effective because instead of starting from the center of the combustion chamber, as is the case with an ordinary spark plug, the flame is initialized in multiple places of the combustion chamber, and develops radially from the periphery of the chamber towards the center of the chamber, and tangentially between each torch.

The energy of the fuel is thus released in a very short time, which is favorable to the thermodynamic efficiency of the positive-ignition engine because not only the triggering is more productive in terms of work, but the reduced sensitivity to rattling which results from such a rapid combustion allows operating said engine with a significantly higher volumetric ratio.

In any event, the U.S. Pat. No. 4,319,552, or the solution proposed in Patent FR 2,986,564 belonging to the applicant, or in the related patents previously mentioned, cannot be compared to the multitude of patents which involve injecting only fuel into a prechamber or not, and not a mixture of air and fuel.

These patents include, for example, Patent No. GB 2 311 327 A belonging to Fluid Research Limited, U.S. Pat. No. 4,864,989 belonging to Tice Technology Corp., U.S. Pat. No. 4,124,000 belonging to General Motors, U.S. Pat. No. 4,239,023 belonging to Ford Motor Company, U.S. Pat. No. 4,892,070 belonging to inventor Dieter Kuhnert, U.S. Pat. No. 2001/0050069 A1 belonging to inventors Radu Oprea and Edward Rakosi, or US Pat. No. 2012/0103302 A1 belonging to inventor William Attard on the principle of which the ignition system called "Turbulent Jet Ignition", developed by the German company "Mahle" for engines of Formula 1, was based.

There is indeed a fundamental difference between the solutions set forth in the above-mentioned patents, which are intended for so-called "lean-burn" positive-ignition engines, whose sole purpose is to enrich the fuel charge around the point of ignition because the charge as a whole is low in fuel but rich in oxygen, and the solutions set forth in Patent FR 2 986 564 and related patents which are mainly intended for positive-ignition engines operating with a charge heavily diluted with cooled EGR and which are intended to provide a mixture rich in fuel AND in oxygen around the ignition point, because the charge as a whole is low in fuel AND in oxygen.

At this point, it has been noted that injecting a highly flammable pilot charge consisting of air and fuel to envelop the electrodes of the spark plug with said charge, as proposed in Patent No. FR 2,986,56, allows to effectively ignite a main charge strongly diluted with EGR.

It has also been noted that once said main charge has been ignited, the combustion develops rapidly until about fifty percent of the total quantity of fuel contained in said charge has been burnt. Beyond said fifty percent, combustion develops more slowly, so that from a certain EGR content in the main charge, the thermodynamic efficiency of the positive-ignition engine decreases rather than increases as expected.

It has been assumed that if—as proposed in U.S. Pat. No. 4,319,552—the pilot charge was injected into a prechamber in which the electrodes of the spark plug are housed, the latter problem of development of combustion beyond fifty percent would be fully or partially resolved.

Indeed, said prechamber would eject through its orifices torches of flaming gas animated with a high speed that would both initialize the combustion over a great radial length around the ignition point, but would also furrow the flame front which would enhance the development of the flame perpendicularly to said torches.

However, the latter solution is not fully satisfactory for many reasons, some of which led to abandon ignition devices based on a prechamber, particularly in the context of positive-ignition engines.

Indeed, in order to be effective, the prechamber must have a sufficiently protruding dome so that the orifices through which the flaming gases are ejected to form torches do not touch the cold internal walls of the engine. By passing at high speed through said orifices, said gases heat up said dome which—from a certain temperature—behaves like a "flaming ball" in the same manner as the ignition system of the internal combustion engine invented by Stuart Herbert-Akroyd and described in the Patent CHD4226 of Dec. 4, 1891. Such a hot spot then potentially leads to inadvertent ignitions of the main charge not controlled by spark. The rattling that may follow is likely to damage or even destroy the positive-ignition engine.

One solution may be to intensively cool said dome to prevent it from becoming a hot spot. However, the resulting heat export would negatively affect, on the one hand, the efficiency of flaming gas torches whose temperature and velocity are reduced during their passage through the orifices in said dome, and, on the other hand, the thermodynamic efficiency of the positive-ignition engine.

In other words, either the dome is too hot or too cold and, most importantly, the ignition of the main charge becomes too dependent on the prechamber and the pilot charge. This dependence is a handicap when the positive-ignition engine requires little or no dilution of its main charge with EGR, which occurs in many cases.

Indeed, the formation of an air-fuel pilot charge brought to high pressure is not free in terms of energy. It is first necessary to compress air, which requires a compressor driven by the positive-ignition engine itself, and then inject fuel into said air. Another strategy may consist in directly compressing an air-fuel mixture previously formed.

It should be noted that because of its non-negligible energy cost, with same ignition efficiency, the smaller the mass of the pilot charge compared to that of the main charge, the better the final energy output of the positive-ignition engine when It operates under a high rate of EGR. It is therefore necessary to do everything possible to give the pilot charge a specific efficiency for igniting the largest possible main charge, relative to the mass of said pilot charge.

In other words, with the same ignition efficiency, the pilot charge must lead to the compression of the smallest amount of air-fuel mixture possible, under the lowest pressure possible.

However, the energy expenditure related to the compression of the pilot charge is not always justified, especially when the main charge is hardly diluted with EGR, or not at all. However, at partial charges—which characterize the operation of a vehicle engine in the majority of its operating time—pumping losses can be reduced by means of a flexible control of the intake valves.

At partial charges, this strategy, known as "Variable Valve Actuation" advantageously replaces the EGR and leads to positive-ignition engine yields similar to those allowed by said EGR without having to resort to a pilot charge highly consuming in energy.

High charges under strong turbocharging may also be another case where the pilot charge is not necessary.

Indeed, the EGR increases the boost pressure required with the same energy introduced into the cylinder(s) of the positive-ignition engine. At very high charges and while the charge of said engine is diluted with EGR, in order to obtain the desired power for the positive-ignition engine, the supercharger compressor must work harder than if the charge was not diluted. Beyond a certain rate of EGR, the turbine placed in the exhaust of the engine no longer has enough power to drive said compressor. The rate of accessible EGR is limited to the point that the pilot charge is no longer necessary to ensure the initialization and development of the combustion.

In short, the ideal situation would be to ignite the main charge by means of a conventional spark plug when said charge is hardly diluted with EGR, or not at all, and by means of a pilot ignition device with pilot charge if possible with prechamber when said charge is highly diluted with EGR.

A second spark plug could eventually compensate for this need. However, it is virtually impossible to accommodate said second spark plug in the cylinder head of a modern automobile engine equipped with four valves per cylinder and an injector that opens directly into the combustion chamber.

So, if one wanted to benefit at the same time from the advantages, on the one hand, of a prechamber as described for example in U.S. Pat. No. 4,319,552 when one resorts to a pilot charge injection according to the principles stated in Patent FR 2 986 564 and, on the other hand, of a conventional ignition with a conventional spark plug, one would have to be able to retract said prechamber when the conventional spark plug would operate and vice versa.

In addition, when the prechamber is used, it would be necessary that said prechamber not behave like a "flaming-ball" ignition device, as previously mentioned, or at least that the initialization of the combustion of the main charge be effectively triggered at the selected time, and not occur at an uncontrolled time.

This involves cooling the flaming sections of the prechamber likely to trigger a self-ignition without decreasing the effectiveness of said prechamber in diffusing flaming gas torches in the three-dimensional space of the combustion chamber of the engine that contains the main charge.

However, insofar as modern supercharged engines almost always receive a direct gasoline injection, the adoption of a prechamber in which are housed the electrodes of the spark plug for the purpose of lighting a pilot charge is almost impossible if one wants, with the same means, to be able to ignite the main charge without resorting to the pilot charge.

Indeed, greatly diluting the charge cooled with EGR is very advantageous on this type of engines. However, the electrodes of the spark plug of supercharged engines with direct injection must be protruding so that the highly flammable fuel mixture formed by the fuel injector bathes said electrodes. Now, if said electrodes are inside a prechamber provided with orifices, this condition is not fulfilled and the initialization of the combustion can no longer be guaranteed. To circumvent this problem, it would be necessary to always resort to ignition by pilot charge, whose energy cost is not marginal.

The difficulty of reaching the electrodes of the spark plug with the fuel mixture if said electrodes are housed in a prechamber is particularly addressed, for example, in Patent No. EP 1 464 804 A1 belonging to Peugeot Citroën Automobile, which claims a significant direct injection pressure facilitating the penetration of part of the air-fuel mixture inside the prechamber through the orifices in the wall of said prechamber. Moreover, the latter patent inherits the principles of Patent No. EP 1 411 221 A2 of the same applicant in which the "flaming ball" effect, implicitly addressed therein, is potentially produced by the prechamber and dreaded by motorists for triggering the rattling.

Indeed, in claim No. 10 of said patent, it is proposed to build the wall of the prechamber out of an alloy having a thermal conductivity at 20° C. of at least 10 W/K/m and preferably at least 30 W/K/m. It is understood that this feature is sought so that the wall of the prechamber can cool as quickly as possible to avoid the "flaming ball" effect.

In claim No. 13 of the same patent, it is also found that the walls and orifices of the prechamber can be coated with a refractory material, this being indicative of the need to also keep a material sufficiently hot so as not to excessively reduce the temperature of the flaming gas torches, and to avoid too much heat export to the cold parts of the thermal engine. However, such a refractory material would not fail to promote the "flaming ball" effect, which is, for that matter, insurmountable.

It is also readily understood that the potential problems disclosed in the aforementioned Patents EP 1 464 804 A1 and EP 1 411 221 A2 are found in a different form in many patents which describe spark plugs in which a prechamber is arranged. These patents include those known under the number DE 0 675 272 A1 and its variant WO 03/071644 A1, and those published under the numbers EP 1 143 126 A2 or EP 1 701 419 A1.

It will be noted that the idea of producing spark plugs with an integrated prechamber is old, as attested by U.S. Pat. No. 2,047,575 of Jul. 14, 1936.

Moreover, the spark plugs disclosed in these patents comprise a "passive" prechamber which consists of a simple cap with orifices. This type of prechamber is mainly used in engines operating at steady speed. Indeed, the section of the orifices of said prechamber are provided so that a sufficient differential pressure is obtained at the time of ignition of the charge fraction contained in the prechamber so that the flaming gas torches reach a sufficient ejection speed through said orifices.

The problem is that if the prechamber empties via said orifices, it also fills via the same orifices. Consequently, the use of such spark plugs results from a precise balance between the section of the orifices and the speed of rotation of the engine. This helps to explain why this type of spark plug is not used in cars where the speed of the positive-ignition engine varies constantly.

In addition to the problems posed by the high temperature of the prechamber and its filling and emptying, it should be noted that, in the particular context of the injection of a pilot charge consisting of a mixture of air and fuel, as proposed in Patent No. FR 2 986 564, the problem of the dispersion of said pilot charge in the main charge, before the ignition of said pilot charge, also arises. Any such dispersion reduces the specific efficiency of the pilot charge to ignite the main charge. This can only be compensated by increasing the mass of said pilot charge, which is done at the expense of the final energy efficiency of the positive-ignition engine.

The problem stems from the fact that the injector, which introduces the pilot charge into the main charge, needs time to perform the injection of said pilot charge under a pressure necessarily greater than that of the main charge.

It should also be noted that the injection pressure of the pilot charge remains approximately constant, while the pressure of the main charge increases under the effect of its compression following the rising of the piston of the positive-ignition engine towards its top dead center. The beginning of the injection of the pilot charge occurs therefore under a differential pressure greater than the end of said injection. It follows that the speed of ejection of the constituent gases of the pilot charge is greater at the beginning of the injection than at the end of the injection.

Except if there was a large volume prechamber, which is not possible, part of the pilot charge will inexorably exit through the orifices of the prechamber and mix with the main charge which has a high content of EGR. The mixture between pilot charge and main charge will be particularly pronounced at the beginning of the injection. The flammability of the mixture thus constituted of air, fuel and EGR will therefore necessarily be heterogeneous in the volume of the prechamber and out of the prechamber. The efficiency of the pilot charge to ignite as quickly as possible will be reduced as well as the efficiency of the burning gas torches to ignite the main charge. This reduction in efficiency can only be offset by an increase in the air and fuel mass of the pilot charge, which is at the expense of the overall energy efficiency of the positive-ignition engine.

Ideally, dispersing the pilot charge in the main charge before the ignition of said pilot charge should therefore be avoided by all means.

Also ideally, and as we have seen previously, it would be necessary to inject the air-fuel pilot charge in a prechamber only when the positive-ignition engine operates under a high level of EGR, whereas when said engine operates only under low EGR, or even none, a conventional spark plug should be used to ignite the main charge.

Limiting the weight of the pilot charge to a minimum to minimize the energy cost of compression, and increasing as much as possible the efficiency of said pilot charge to ignite the main charge should always be part of the objective when the engine is operating under a high rate of cooled EGR.

When only a conventional spark plug is used to ignite the main charge, it would be best—again, ideally—for the prechamber to be eliminated so that it could not behave in any way like a "flaming ball".

Ultimately, it would be very advantageous to provide to the device described by the patent FR 2 986 564, which proved to be effective to initiate the combustion under very high levels of cooled EGR and to develop said combustion until about fifty percent of the fuel contained in the main charge is burnt, the capacity to develop said combustion very rapidly until at least ninety or one hundred percent of said fuel is burnt.

This could be achieved by means of a prechamber as suggested by U.S. Pat. No. 4,319,552, but with the sole condition of circumventing the usual crippling defects of said antechamber, and significantly improving its efficiency.

All of these objectives are addressed by the spark plug with shuttle electrode according to the invention which—according to a particular embodiment—allows:

- benefiting with a single spark plug from the advantages of a prechamber in which a pilot charge is injected then ignited to ignite a main charge by means of flaming gas torches, and from the advantages of protruding electrodes not enclosed in a prechamber, compatible with the direct injection of gasoline, and allowing to directly ignite the main charge by means of an electric arc formed between said electrodes;
- preventing the prechamber from generating any flaming spot that could cause an untimely self-ignition of the main charge;
- minimizing the mass of the pilot charge necessary not only to initialize the combustion of main charges highly diluted with EGR, but also to ensure a rapid development of said combustion until all of said main charges are burnt;
- in the latter objective, avoiding the dispersion of the pilot charge in the main charge during the injection of said pilot charge in said main charge.

To achieve these objectives, the spark plug with shuttle electrode according to the invention allows:

- retracting the prechamber when it is useless, said prechamber then being replaced by protruding electrodes;
- once the prechamber is retracted, actively cooling the surface of said prechamber exposed to flaming gases, between two combustion cycles;
- keeping the prechamber closed during most of the injection time of the pilot charge which is carried out in an enclosed space in which the gases of the pilot charge cannot mix with the gases of the main charge.

It should be noted that the spark plug with shuttle electrode according to the invention does not involve significantly increasing the electrical voltage at the terminals of said spark plug to cause the ignition spark, said voltage remaining in the vicinity of the voltages usually used for ordinary spark plugs.

Said spark plug with shuttle electrode is expected to be inexpensive to mass-produce in order to remain compatible with the economic constraints of most applications for which it is intended, including automobiles. In addition, the service life of said spark plug is assumed to be similar to that of a conventional spark plug.

It is understood that the spark plug with shuttle electrode according to the invention can be applied to any internal combustion positive-ignition engine whatever the type, whatever the fuel, gaseous, liquid or solid, that it consumes, and whether its main charge is diluted with EGR cooled or not, with a neutral gas of any kind whatsoever, or with a gas rich in oxygen or any other combustive.

It is also understood that the pilot charge received by the prechamber of the spark plug with shuttle electrode according to the invention may contain a fuel and/or a combustive different from the fuel and/or combustive which constitutes the main charge of the positive-ignition engine.

The spark plug with shuttle electrode according to the present invention is provided for an internal combustion engine which comprises at least one cylinder in which a piston can translate to form—with a cylinder head—a combustion chamber in which a main charge can be ignited, the latter consisting of a combustive-fuel mixture on the one hand, and being more or less diluted with air rich in oxygen or with a neutral gas on the other hand, said internal combustion engine also comprising an intake duct and an exhaust duct opening into said chamber.

The spark plug with shuttle electrode according to the present invention comprises at least electrodes and a ceramic insulator housed in a metal base which has a base thread, and at least one central electrode, and at least one ground electrode, said spark plug comprising also a lamination cavity connected to the combustion chamber included in the internal combustion engine by a lamination duct, while a lamination injector can directly or indirectly inject into said cavity a pilot charge previously pressurized, said charge consisting of a combustive-AF fuel mixture that is highly flammable by means of a spark, said spark plug with shuttle electrode comprising according to the invention:

at least one central electrode which opens into the lamination cavity;

at least one shuttle electrode which is entirely or partly made of an electrically conductive material and which is partially or entirely housed with a small clearance in the lamination duct, said shuttle electrode being interposed between the central electrode and a ground electrode and having, firstly, a chamber-side end facing the ground electrode and being exposed to the pressure prevailing in the combustion chamber and, secondly, a cavity-side end facing the central electrode and which is exposed to the pressure prevailing in the lamination cavity, said shuttle electrode being able to translate in said duct under the effect of the pressure of the gases, either towards the lamination cavity when the pressure prevailing therein is lower than the pressure prevailing in the combustion chamber, or towards the combustion chamber when the pressure prevailing in the latter is lower than the pressure prevailing in the lamination cavity;

at least one cavity-side shuttle electrode abutment that determines the position of the shuttle electrode closest to the lamination cavity;

at least one chamber-side shuttle electrode abutment that determines the position of the shuttle electrode closest to the combustion chamber.

The spark plug with shuttle electrode according to the present invention comprises a shuttle electrode which closes all or part of the lamination duct when it is closest to the lamination cavity, while it opens said duct on a wider section when it is positioned closest to the combustion chamber.

The spark plug with shuttle electrode according to the present invention comprises all or part of the lamination duct which has an insulating sleeve consisting of an electrically insulating and/or thermally insulating and/or refractory material, which is integral with said duct, and which is radially and/or axially interposed between the shuttle electrode and said duct, said shuttle electrode being able to translate inside said sleeve.

The spark plug with shuttle electrode according to the present invention comprises an insulating sleeve which comprises at least one longitudinal channel for gas passage which allows gases to pass from the lamination cavity to the combustion chamber or vice versa, said channel being possibly arranged inside and/or on the inner or outer surface of said sleeve.

The spark plug with shuttle electrode according to the present invention comprises a shuttle electrode which consists of an insulating shuttle body made of an electrically insulating material, said body being traversed from one side to the other lengthwise by a conductive core of which it is integral, said core being made of an electrically conductive material, a first end of said core facing the ground electrode while a second end of said core faces the central electrode.

The spark plug with shuttle electrode according to the present invention comprises a cavity-side shuttle electrode abutment which consists of a shuttle electrode closing seat arranged in the lamination duct or at either end of said duct, said seat cooperating with a shuttle electrode closing flange that is fitted at the periphery and/or at the end of the shuttle electrode.

The spark plug with shuttle electrode according to the present invention comprises a shuttle electrode closing seat and a shuttle electrode closing flange which form a seal when in contact with each other, said seal preventing any gas from passing through at said point of contact when the pressure prevailing in the combustion chamber is greater than the pressure prevailing in the lamination cavity.

The spark plug with shuttle electrode according to the present invention comprises a chamber-side shuttle electrode abutment which consists of a shuttle electrode opening seat arranged in the lamination duct or at either end of said duct, or in the metal base, said seat cooperating with a shuttle electrode opening flange that is fitted at the periphery and/or at the end of the shuttle electrode.

The spark plug with shuttle electrode according to the present invention comprises a shuttle electrode opening seat and a shuttle electrode opening flange which form a seal when in contact with each other so as to prevent any gas from passing through at said point of contact.

The spark plug with shuttle electrode according to the present invention comprises a shuttle electrode which comprises guiding means at its periphery which maintain said shuttle electrode approximately centered in the lamination duct, and approximately in the same longitudinal orientation as said duct, irrespective of the axial position of said shuttle electrode with respect to said duct.

The spark plug with shuttle electrode according to the present invention comprises a shuttle electrode which comprises at least one longitudinal channel for gas passage which allows the gases to pass from the lamination cavity to the combustion chamber or vice versa, said channel being possibly arranged inside and/or on the surface of said shuttle electrode and being possibly provided over the entire length of said shuttle electrode while the two ends of said channel open respectively at the end on the chamber side and at the end of the cavity side, or only along a portion of said length while at least one of said two ends of said channel opens radially from the outer surface of the shuttle electrode.

The spark plug with shuttle electrode according to the present invention comprises a shuttle electrode closing flange and a shuttle electrode opening flange which form together form one single closing-opening flange which defines with the lamination duct—when said closing-opening flange is in contact with the shuttle electrode opening seat—a torch ignition prechamber which communicates simultaneously with the lamination cavity, on the one hand, and with the combustion chamber via at least one gas ejection orifice, on the other hand.

The spark plug with shuttle electrode according to the present invention comprises a torch ignition prechamber which is arranged inside the insulating sleeve.

The spark plug with shuttle electrode according to the present invention comprises an insulating sleeve which protrudes from the metal base to present a protruding ejection dome from which the gas ejection orifice opens.

The spark plug with shuttle electrode according to the present invention comprises a protruding ejection dome which is an insert on the insulating sleeve.

The spark plug with shuttle electrode according to the present invention comprises a shuttle electrode opening seat which is arranged in the protruding ejection dome.

The spark plug with shuttle electrode according to the present invention comprises an inner peripheral wall of the torch ignition prechamber which is cylindrical while the closing-opening flange is housed at low radial clearance in said prechamber.

The spark plug with shuttle electrode according to the present invention provides that when the shuttle electrode is positioned close to the combustion chamber, that is to say either in the vicinity or in contact with the chamber-side shuttle electrode abutment with which it cooperates, the shuttle electrode closing flange uncovers at least one gas ejection orifice which connects the lamination cavity with the combustion chamber.

The spark plug with shuttle electrode according to the present invention comprises a injector which can inject the pilot charge, directly or indirectly, via an injector outlet duct, into the lamination cavity through an annular chamber of pilot charge injection which is arranged either in a threaded plug well in which the metal base is screwed by means of the base thread, or on the outer periphery of said metal base, or both in said well and at said periphery of said base, said annular chamber communicating with the lamination cavity via at least one gas injection channel arranged approximately radially in the metal base.

The spark plug with shuttle electrode according to the present invention comprises a lamination cavity which is arranged inside the ceramic insulator.

The description that follows with reference to the accompanying drawings, and given by way of non-limiting example, will allow to better understand the invention, the features that it comprises, and the benefits it is likely to provide:

FIG. 1 is a schematic sectional view of the spark plug with shuttle electrode according to the invention such that it can be installed in the cylinder head of an internal combustion engine.

FIG. 2 is a schematic sectional view of the spark plug with shuttle electrode according to the invention whose shuttle electrode is made of a single piece of electrically conductive material that can translate in an insulating sleeve included in the lamination duct, a shuttle electrode closing seat forming the shuttle electrode abutment on the cavity side, while a shuttle electrode opening seat forms the shuttle electrode abutment on the chamber side, both said abutments cooperating with a closing-opening flange included in the shuttle electrode.

Figure 12:
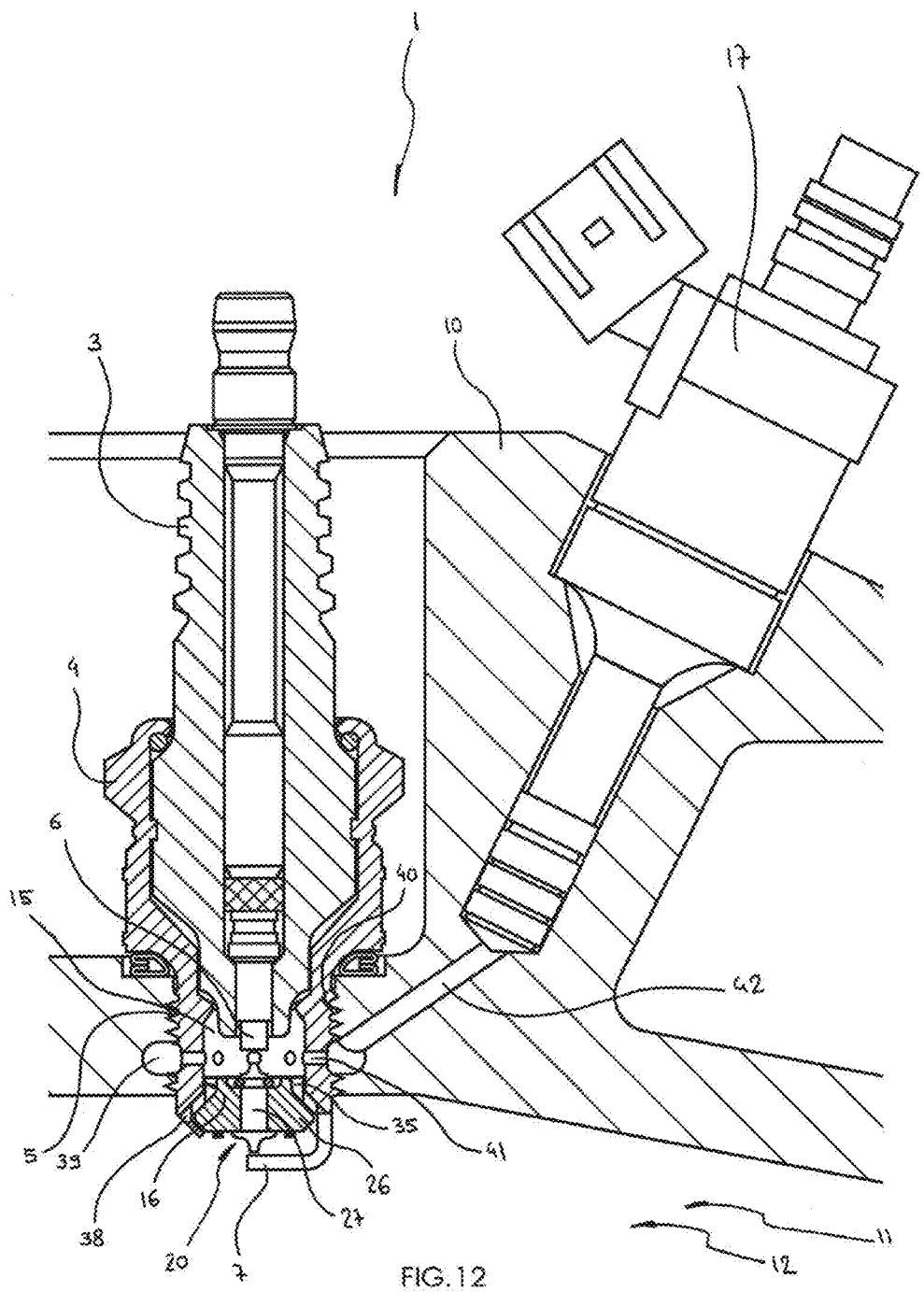
Figure 13:
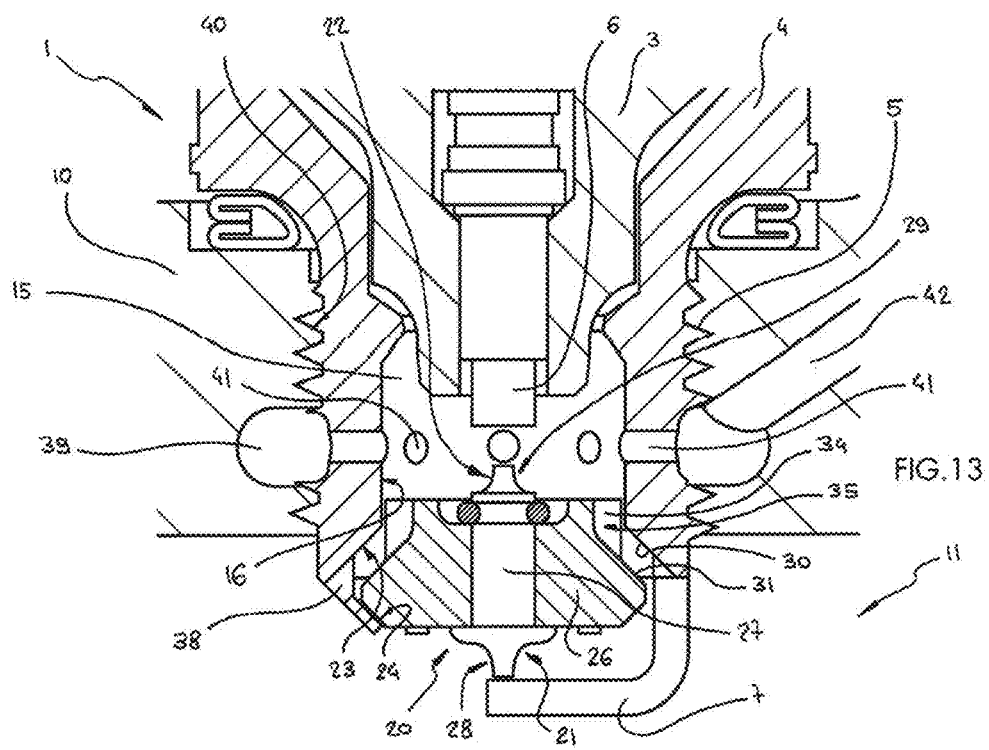
Figure 14:
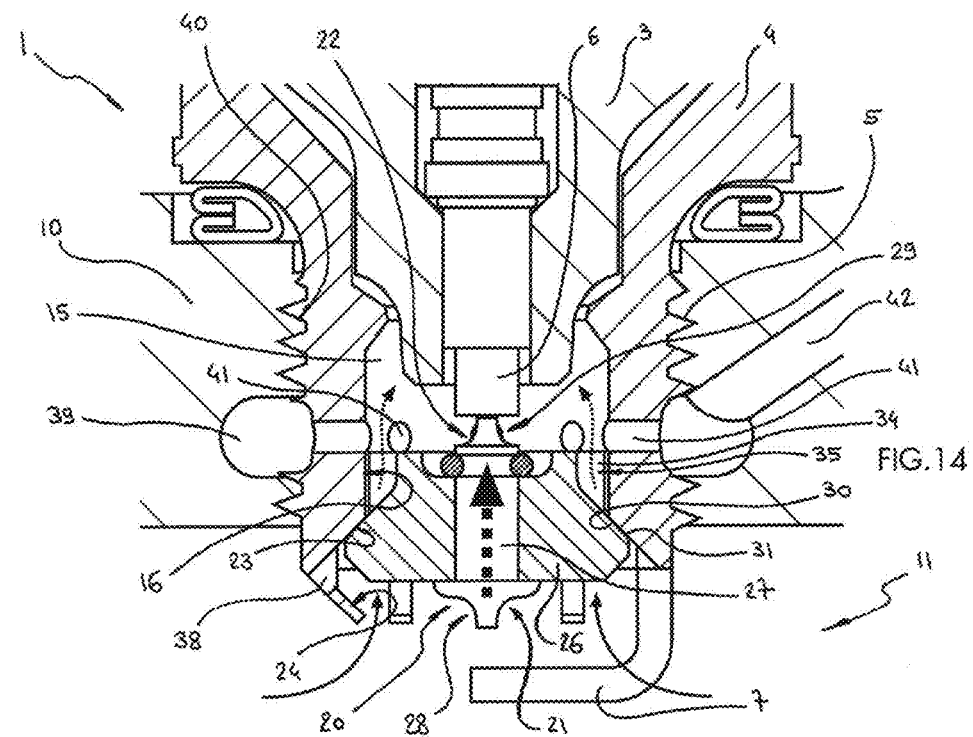
Figure 17:
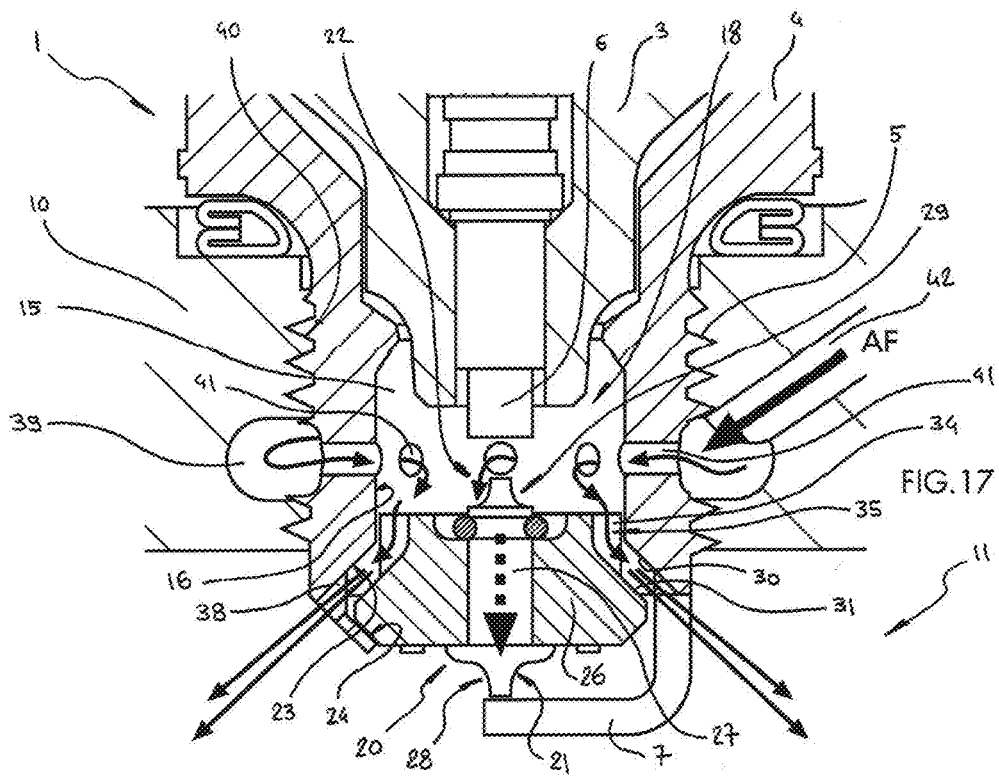
Figure 18:
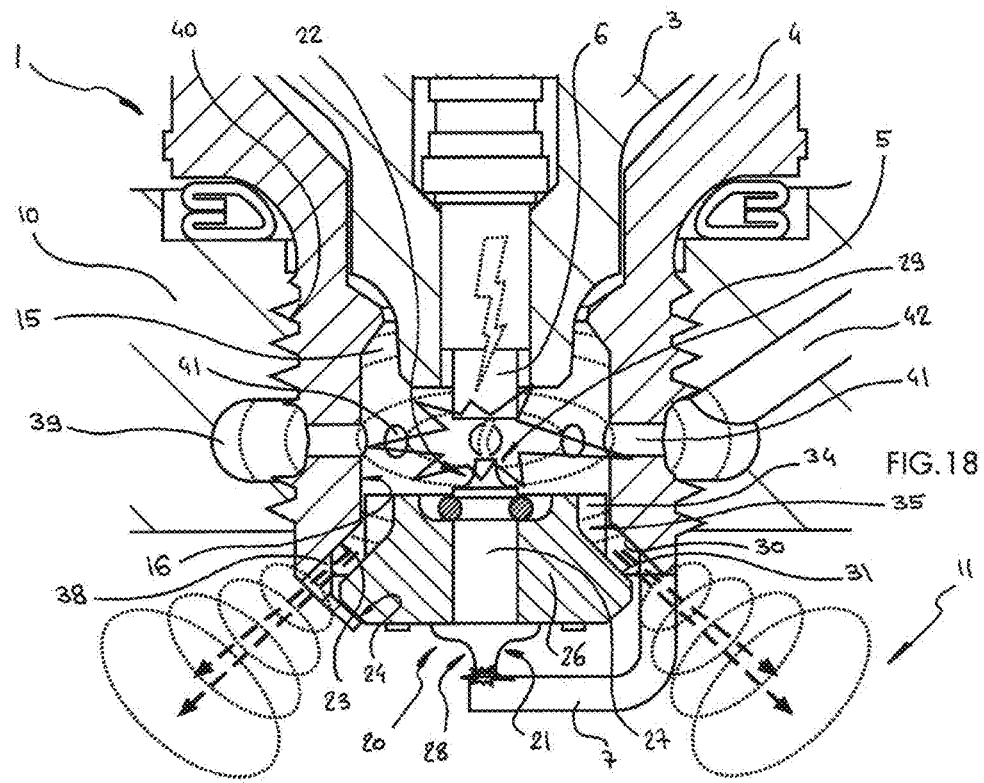

FIG. 12 is a schematic sectional view of the spark plug with shuttle electrode according to the invention whose shuttle electrode consists of an insulating shuttle body traversed from one side to the other along its length by a conductor core to which it is integral, the cavity-side shuttle electrode abutment consisting of a shuttle electrode closing seat arranged at the end of the lamination duct, said seat cooperating with a shuttle electrode closing flange provided at the end of the shuttle electrode.

Figures 15, 16:
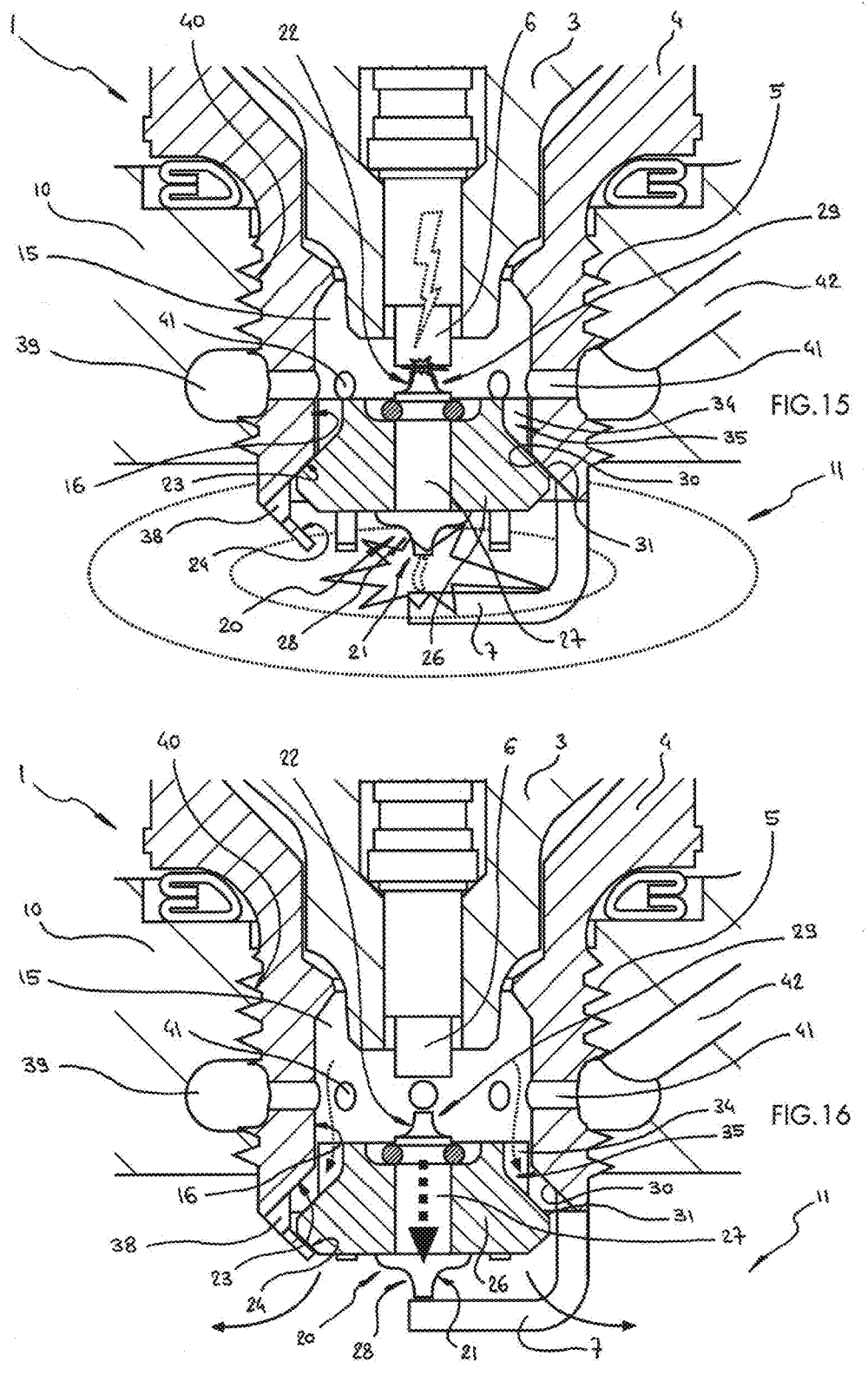

FIGS. 13-18 are partial close-up views in schematic section of the spark plug with shuttle electrode according to the invention and according to the particular configuration shown in FIG. 12, said close-up views illustrating various phases of operation of said spark plug.

Figure 19:
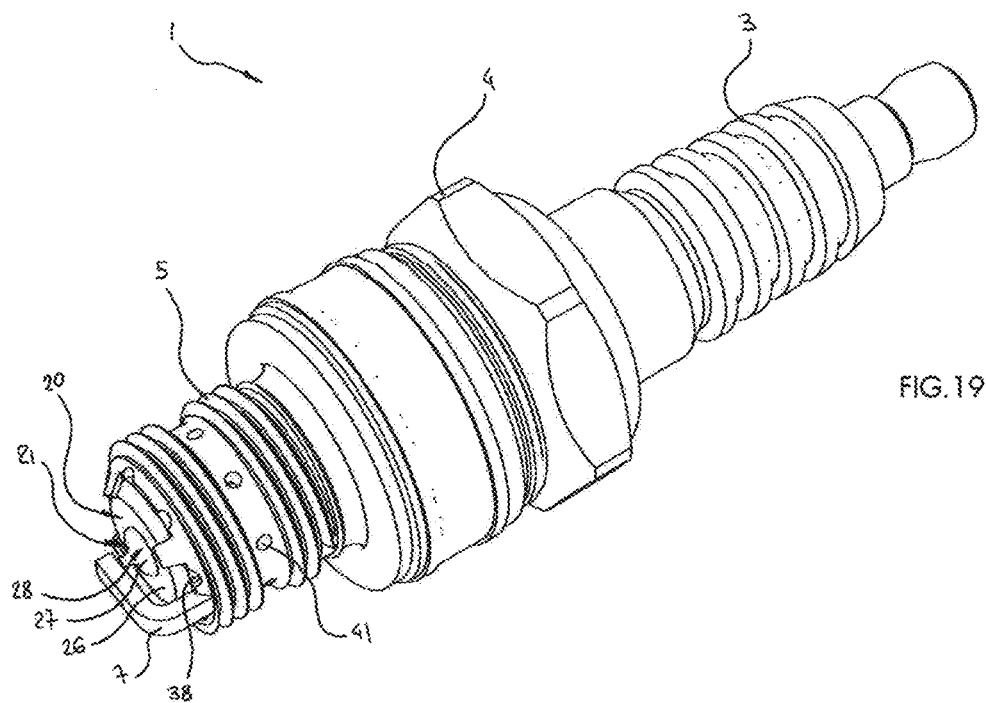

FIG. 19 is a three-dimensional view of the spark plug with shuttle electrode according to the invention and according to the variant embodiment shown in FIG. 12.

Figure 20:
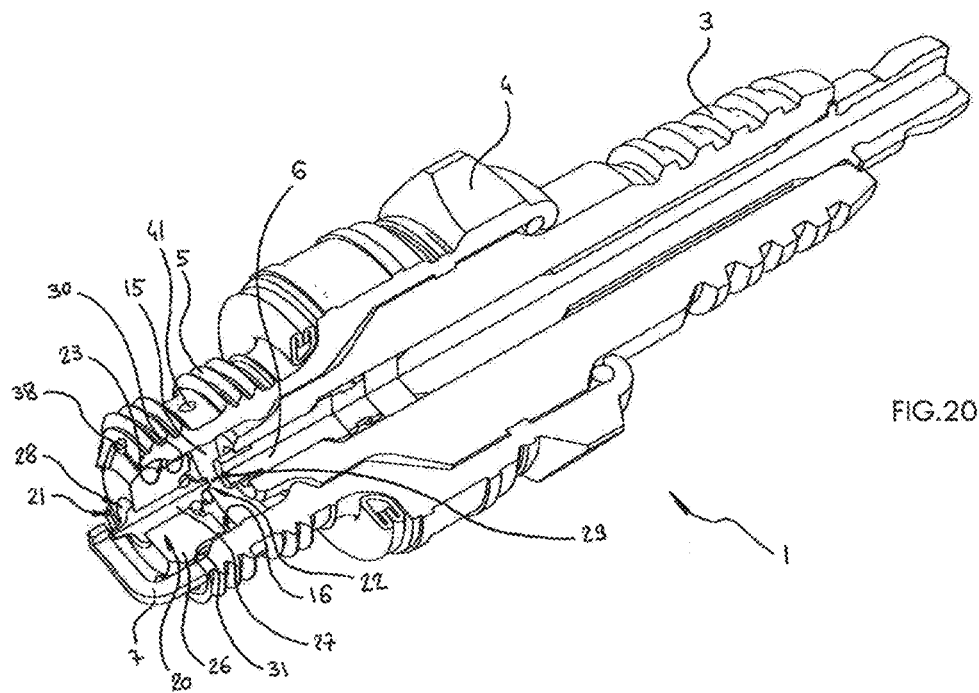

FIG. 20 is a three-dimensional view in broken longitudinal section of the spark plug with shuttle electrode according to the invention and according to the variant embodiment shown in FIG. 12.

Figure 21:
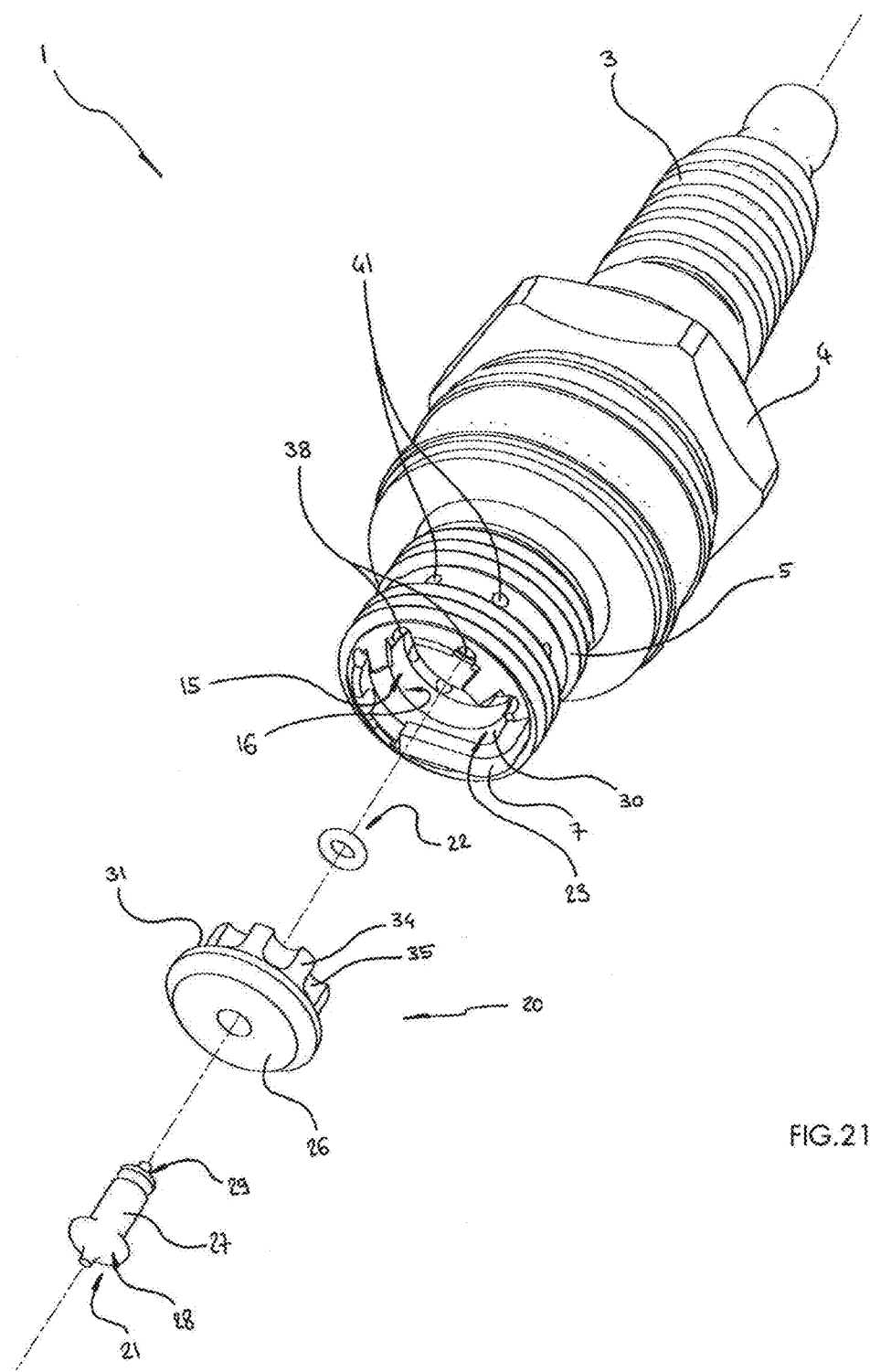

FIG. 21 is an exploded three-dimensional view of the spark plug with shuttle electrode according to the invention and according to the variant embodiment shown in FIG. 12.

DESCRIPTION OF THE INVENTION

FIGS. 1-21 show the spark plug with shuttle electrode 1, various details of its components, its variants, and its accessories.

Figure 1:
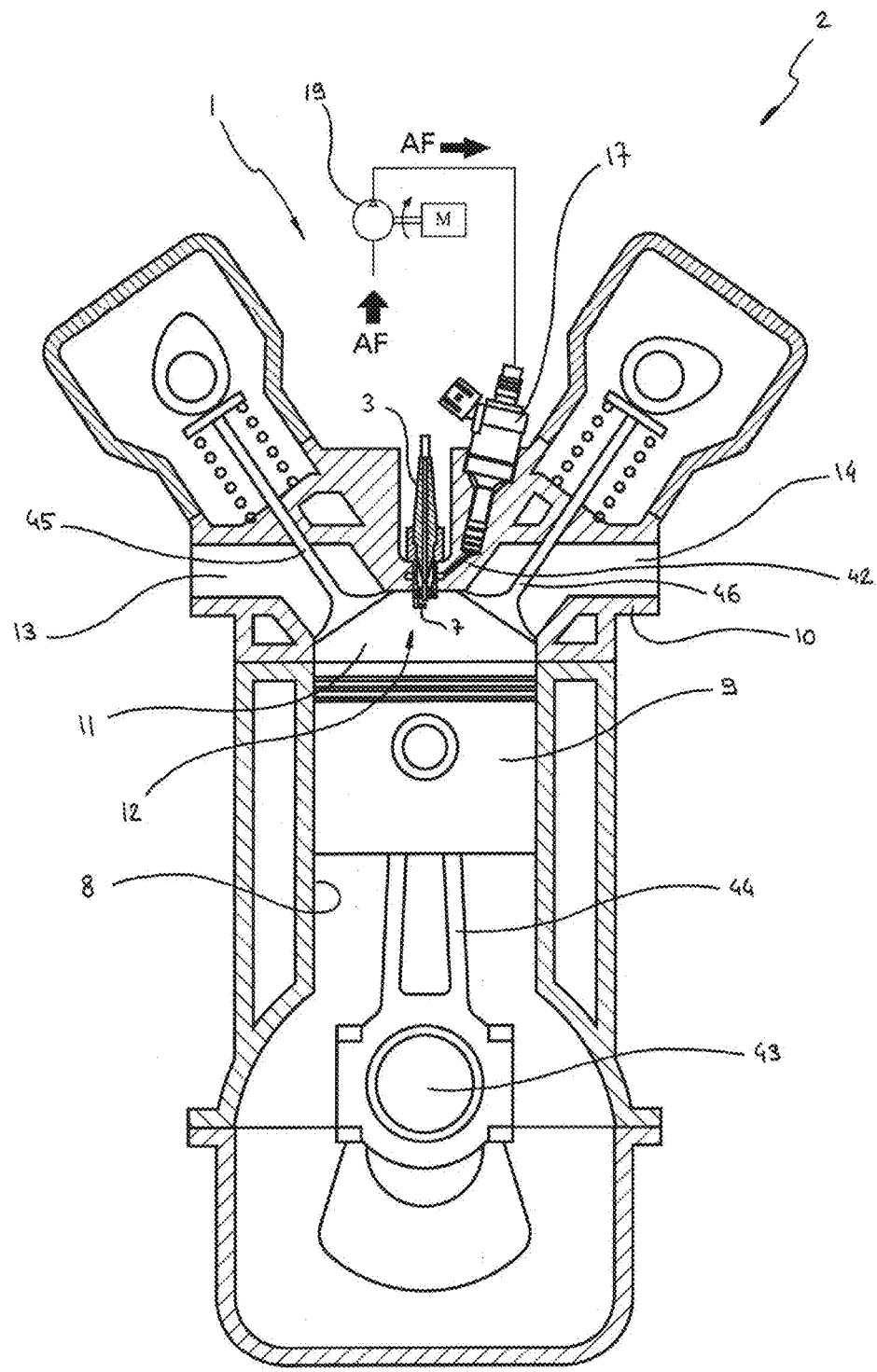

As illustrated in FIG. 1, the spark plug with shuttle electrode 1 is provided for internal combustion engine 2 which comprises at least one cylinder 8 in which a piston 9 can translate to form—with a cylinder head 10—a combustion chamber 11 wherein a main charge 12 can be ignited, the latter consisting, on the one hand, of a combustive-fuel mixture and, on the other hand, being more or less diluted with air rich in oxygen or with a neutral gas.

The internal combustion engine 2, for which the spark plug with shuttle electrode 1 is provided, further comprises an intake duct 13 and an exhaust duct 14 opening into the combustion chamber 11 while said spark plug 1 comprises a ceramic insulator 3 housed in a metal base 4 which has a base thread 5.

The spark plug with shuttle electrode 1 also comprises at least one central electrode 6 and at least one ground electrode 7 while it also comprises a lamination cavity 15 connected to the combustion chamber 11 by a lamination duct 16 while a lamination injector 17 can directly or indirectly inject into said cavity 15 a pilot charge 18 previously pressurized by a lamination compressor 19, said charge 18 consisting of a combustive-AF fuel mixture easily flammable by means of a spark.

FIGS. 1-21 show that the spark plug with shuttle electrode 1 differs from the state of the art in that the central electrode 6 opens into the lamination cavity 15.

Moreover, FIGS. 1-21 show that the spark plug with shuttle electrode 1 comprises a shuttle electrode 20 which is wholly or partly made of an electrically conductive material and which is partially or entirely housed with a small clearance in the lamination duct 16.

It will be noted in FIGS. 1-21 that the shuttle electrode 20 is interposed between the central electrode 6 and the ground electrode 7 and has, on the one hand, a chamber-side end 21 which faces the ground electrode 7 and which is exposed to the pressure prevailing in the combustion chamber 11 and, on the other hand, a cavity-side end 22 which faces the central electrode 6 and which is exposed to the pressure prevailing in the lamination cavity 15.

It will be noted that according to the spark plug with shuttle electrode 1 of the invention, the shuttle electrode 20 can translate in the lamination duct 16 under the effect of the pressure of the gas, either towards the lamination cavity 15 when the pressure prevailing in the latter is lower than the pressure in the combustion chamber 11, or towards the combustion chamber 11 when the pressure prevailing in the latter is lower than the pressure in the lamination cavity 15.

It may be noted that the shuttle electrode 20 can also move in the lamination duct 16 under the effect of gravity or acceleration, which cannot be interpreted as any advantage or a desired mode of operation.

The spark plug with shuttle electrode 1 according to the invention further comprises at least one cavity-side shuttle electrode abutment 23 which determines the position of the shuttle electrode 20 closest to the lamination cavity 15.

Finally, said spark plug 1 according to the invention comprises at least one chamber-side shuttle electrode abutment 24 which determines the position of the shuttle electrode 20 closest to the combustion chamber 11.

It will be noted that according to a particular embodiment of the spark plug with shuttle electrode 1 according to the invention, the cavity-side shuttle electrode abutment 23 and/or the chamber-side shuttle electrode abutment 24 may respectively consist of the central electrode 6 and/or the ground electrode 7.

Alternatively, the shuttle electrode 20 may comprise indexing means in rotation along its longitudinal axis which prevent it from rotating along said axis without preventing it from translating into the lamination duct 16.

It will be noted that, advantageously, the shuttle electrode 20 and/or the lamination duct 16 in which it translates may be coated with a known anti-friction and/or non-adherent and/or refractory material.

In addition, the shuttle electrode 20 may be hollow or have lightening means while all types of electrodes known to those skilled in the art can be applied to the central electrode 6, to the ground electrode 7, at the chamber-side end 21 or at the cavity-side end 22.

According to a particular embodiment of the spark plug with shuttle electrode 1 according to the invention, particularly visible in FIGS. 2 to 21, the shuttle electrode 20 may close all or part of the lamination duct 16 when it is closest to the lamination cavity 15, while it may open said duct 16 on a wider section when it is positioned closest to the combustion chamber 11.

As illustrated in FIGS. 2-11, all or part of the lamination duct 16 may comprise an insulating sleeve 25 made of an electrically insulating and/or thermally insulating and/or refractory material, which is integral with said duct 16, and which is radially and/or axially interposed between the shuttle electrode 20 and said duct 16, said shuttle electrode 20 being able to translate inside said sleeve 25.

It should be noted that according to a particular embodiment of the spark plug with shuttle electrode 1 according to the invention, the insulating sleeve 25 may be integral with the ceramic insulation 3 and be arranged in the same piece of material as the latter. Alternatively, an air gap may be left between at least a portion of the insulating sleeve 25 and the lamination duct 16 so as to limit the heat exchange between said sleeve 25 and said duct 16.

FIGS. 3-8 and FIG. 11 show that, as a variant embodiment of the spark plug with shuttle electrode 1 according to the invention, the insulating sleeve 25 may comprise at least one longitudinal channel 35 for gas passage which allows the gas to pass from the lamination cavity 15 to the combustion chamber 11 or vice versa, said channel 35 being possibly arranged inside and/or on the inner or outer surface of said sleeve 25.

FIGS. 12-21 show in particular that the shuttle electrode 20 may consist of an insulating shuttle body 26, itself made of an electrically insulating material, said body 26 being traversed from end to end in the direction of its length by a conductive core 27 of which it is integral, said core 27 being made of an electrically conductive material, a first end 28 of said core 27 facing the ground electrode 7 while a second end 29 of said core 27 faces the central electrode 6.

FIGS. 3-8, FIG. 11, FIGS. 13-18 and FIGS. 20 and 21 make it clear that the cavity-side shuttle electrode abutment 23 may consist of a shuttle electrode closing seat 30 provided in the lamination duct 16 or at either end of said duct 16, said seat 30 cooperating with a shuttle electrode closing flange 31 provided at the periphery and/or at the end of the shuttle electrode 20.

It should be noted that if the lamination duct 16 houses an insulating sleeve 25, the shuttle electrode closing seat 30 may be arranged in said sleeve 25 or at either end of said sleeve 25.

It should also be noted that the shuttle electrode closing flange 31 may be made of a thermally insulating and/or refractory material to be attached to the shuttle electrode 20 made of electrically conductive material.

As a particular embodiment of the spark plug with shuttle electrode 1 according to the invention, the shuttle electrode closing seat 30 and the shuttle electrode closing flange 31 may form a seal when they are in contact with each other, said seal preventing any gas from passing through at said point of contact when the pressure prevailing in the combustion chamber 11 is greater than the pressure prevailing in the lamination cavity 15.

FIGS. 2-8 clearly show that the chamber-side shuttle electrode abutment 24 may consist of a shuttle electrode opening seat 32 arranged in the lamination duct 16 or at any one end of said duct 16, or in the metal base 4, said seat 32 cooperating with a shuttle electrode opening flange 33 provided at the periphery of the shuttle electrode 20 and/or at its end.

It should be noted that if the lamination duct 16 houses an insulating sleeve 25, the shuttle electrode opening seat 32 can be arranged in said sleeve 25 or at either end of said sleeve 25.

It should also be noted that the shuttle electrode opening flange 33 may be made of a thermally insulating and/or refractory material and be attached to the shuttle electrode 20, the latter being made of an electrically conductive material.

It will also be appreciated that the shuttle electrode opening seat 32 and the shuttle electrode opening flange 33 may provide a seal when in contact with each other so as to prevent any gas from passing through said contact.

FIG. 21 clearly shows that the shuttle electrode 20 may comprise in its periphery guide means 34 which hold said shuttle electrode 20 approximately centered in the lamination duct 16, and approximately in the same longitudinal orientation as said duct 16, regardless of the axial position of said shuttle electrode 20 with respect to said conduit 16.

Figure 8:
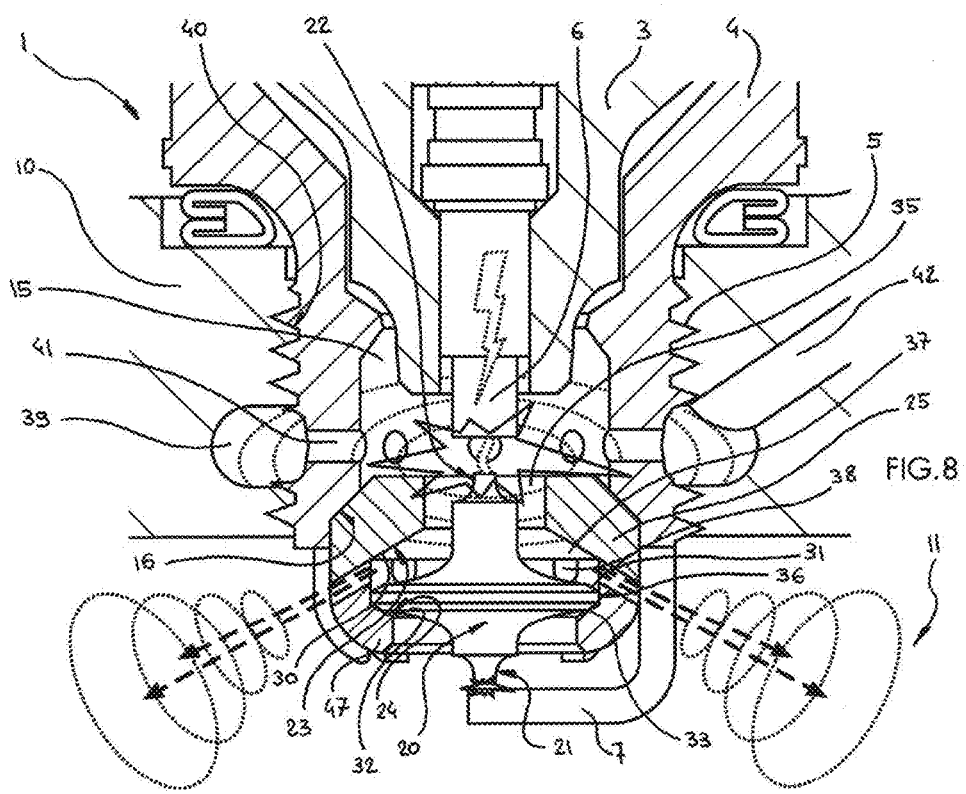
Figure 9:
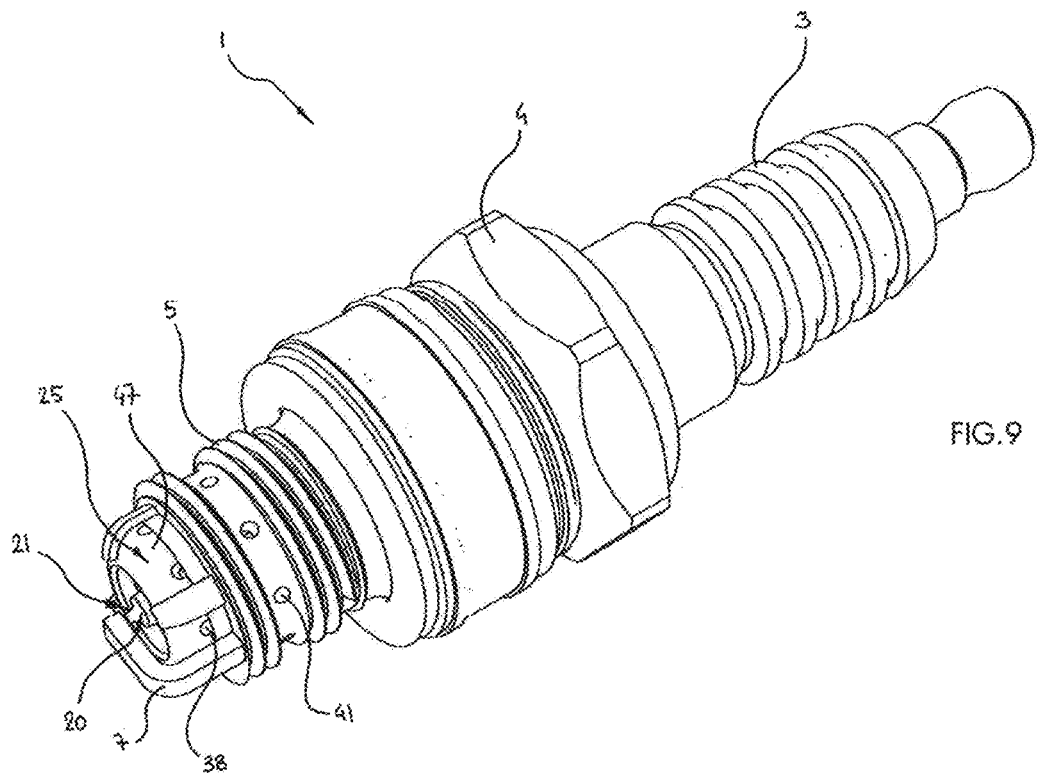
FIG. 9 is a three-dimensional view of the spark plug with shuttle electrode according to the invention and according to the variant embodiment shown in FIG. 2.

FIGS. 2-21 excluding FIGS. 9 and 19, show that the shuttle electrode 20 may comprise at least one longitudinal channel 35 for gas passage which allows the gases to pass from the lamination cavity 15 to the combustion chamber 11 or vice versa, said channel 35 being possibly arranged inside and/or on the surface of said shuttle electrode 20 and located either over the entire length of said shuttle electrode 20 while the two ends of said channel 35 open respectively at the chamber-side end 21 and at the cavity-side end 22, or on only a portion of said length while at least one of said two ends of channel 35 opens radially from the outer surface of the shuttle electrode 20.

As shown in FIGS. 2-8 and FIGS. 10 and 11, the shuttle electrode closing flange 31 and the shuttle electrode opening flange 33 may form together a single closing-opening flange 36 which defines with the lamination duct 16—when said closing-opening flange 36 is in contact with the shuttle electrode opening seat 32—a torch ignition prechamber 37.

It should be noted that in this case, the torch ignition prechamber 37 communicates simultaneously with the lamination cavity 15 on the one hand, and with the combustion chamber 11 via at least one gas ejection orifice 38 on the other hand, which may, for example, be arranged approximately radially, in the metal base 4 or in the insulating sleeve 25.

It will be noted that the gas ejection orifice 38 may be more or less oriented towards the combustion chamber 11 and exit more or less tangentially to the circumference of the metal base 4. In addition, the geometry of the gas ejection orifice 38 may vary depending on whether the jet of gas coming out of said orifice 38 is provided rather directed, or rather diffuse.

For example, the gas ejection orifice 38 may be cylindrical, conical, or form a convergent or a divergent. In addition, the closing-opening flange 36 may be made of a thermally insulating and/or refractory material to be positioned on the shuttle electrode 20 made of electrically conductive material.

FIGS. 3-8 and FIGS. 10 and 11 show that the torch ignition prechamber 37 can be arranged inside the insulating sleeve 25.

In this case, the insulating sleeve 25 may protrude from the metal base 4 to present a protruding ejection dome 47 from which the gas ejection orifice 38 opens, said dome 47 being able, for example, to be held in position in said base 4 by clamps or by a crimping flange.

Moreover, and as illustrated in FIGS. 2-11, the protruding ejection dome 47 may be an insert on the insulating sleeve 25 which is also made of an electrically insulating and/or thermally insulating and/or refractory material.

This particular configuration allows in particular to assemble the spark plug with shuttle electrode 1 according to the invention and particularly, to install the closing-opening flange 36 constituting the shuttle electrode 20 in the torch ignition prechamber 37.

FIGS. 3-8 show that the shuttle electrode opening seat 32 may be arranged in the protruding ejection dome 47.

Figure 10:
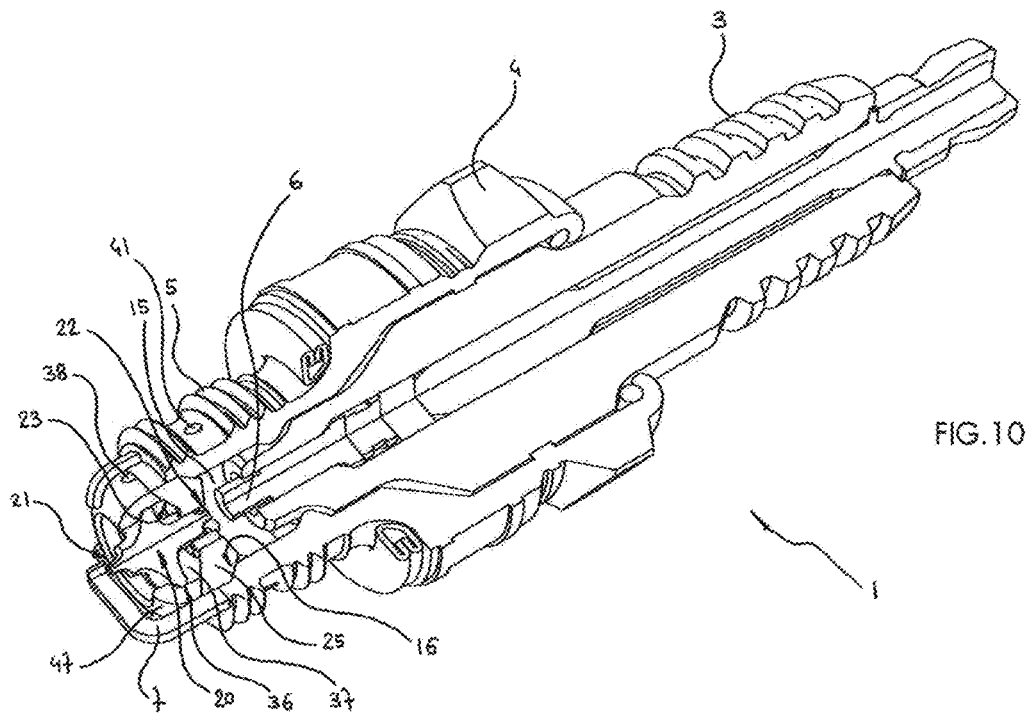
FIG. 10 is a three-dimensional view in broken longitudinal section of the spark plug with shuttle electrode according to the invention and according to the variant embodiment shown in FIG. 2.
Figure 11:
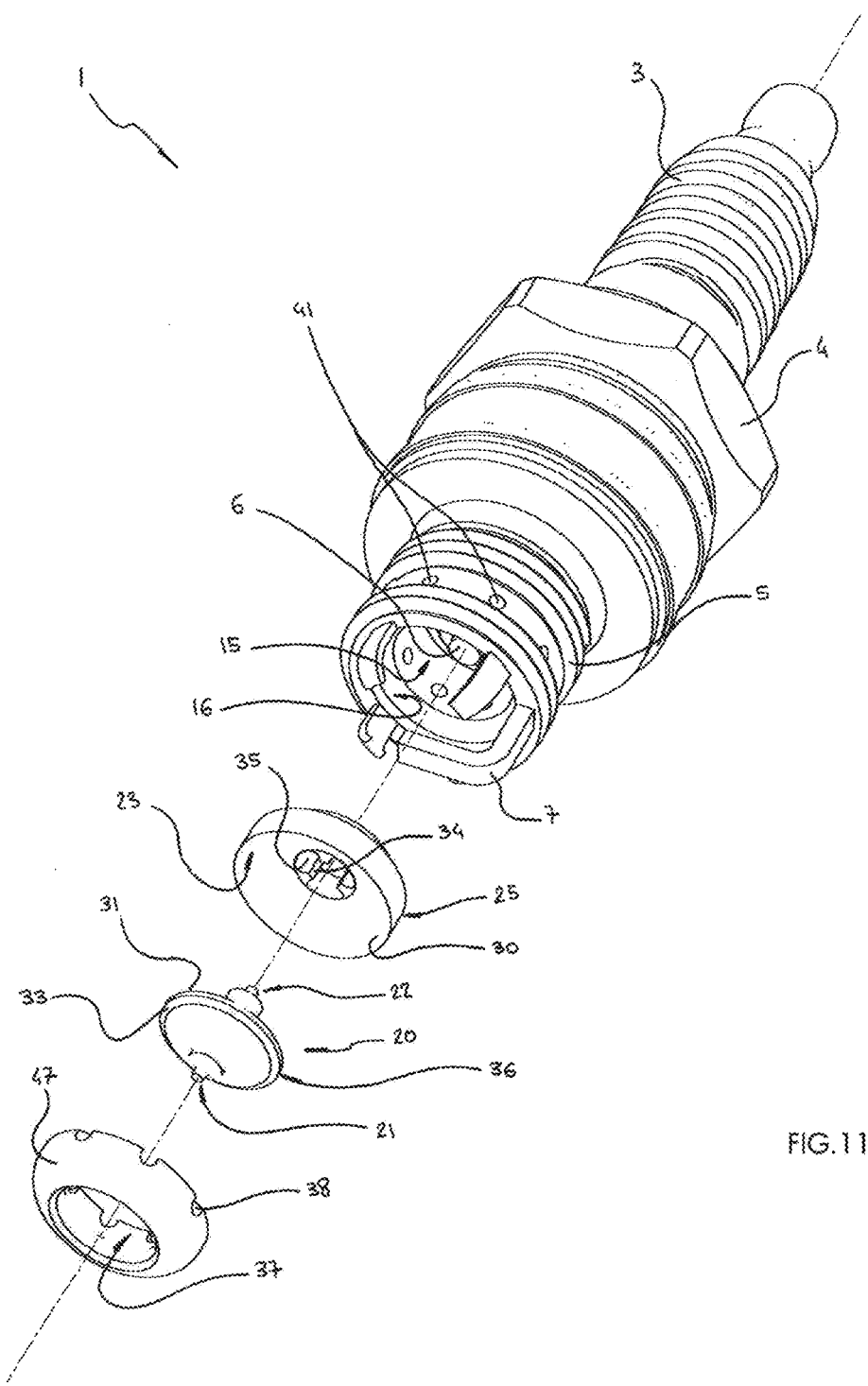
FIG. 11 is an exploded three-dimensional view of the spark plug with shuttle electrode according to the invention and according to the variant embodiment shown in FIG. 2.

As is particularly visible in FIGS. 10 and 11, the inner peripheral wall of the torch ignition prechamber 37 may be cylindrical while the closing-opening flange 36 may be housed at a small radial clearance in said prechamber 37 so as to leave a small radial clearance between said flange 36 and said wall regardless of the position of the shuttle electrode 20 with respect to the lamination duct 16, said small radial clearance constituting a restricted passage which slows the passage of the gases between the lamination cavity 15 and the combustion chamber 11.

Moreover, FIGS. 13, 16, 17 and 18 show that when the shuttle electrode 20 is positioned close to the combustion chamber 11, that is to say either in the vicinity or in contact with the shuttle electrode abutment on the chamber side 24 with which it cooperates, the shuttle electrode closing flange 31 can uncover at least one gas ejection orifice 38 which connects the lamination cavity 15 with the combustion chamber 11, said orifice 38 being arranged, for example, approximately radially in the metal base 4 and be more or less oriented towards the combustion chamber 11 and exiting more or less tangentially to the circumference of the metal base 4.

In addition, the geometry of the gas ejection orifice 38 may vary depending on whether the jet of gas leaving said orifice 38 is provided rather directed, or rather diffuse. For example, the gas ejection orifice 38 may be cylindrical, conical, or form a convergent or a divergent.

Figure 2:
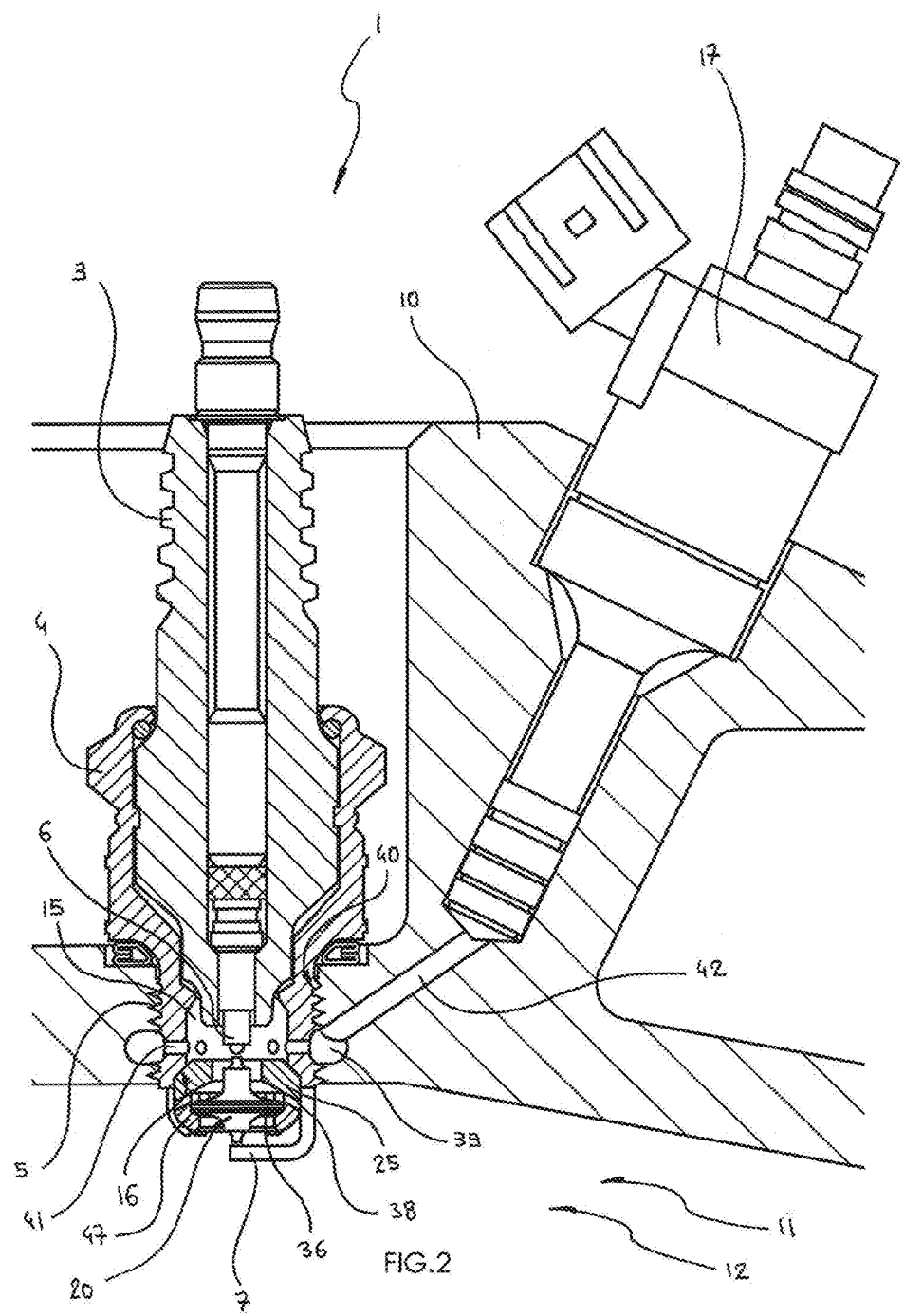

According to a particular variant of the spark plug with shuttle electrode 1 according to the invention particularly shown in FIGS. 2 and 12, the lamination injector 17 may, directly or indirectly via an injector outlet duct 42, inject the pilot charge 18 in the lamination cavity 15 via an annular pilot charge injection chamber 39.

In such case, the annular pilot charge injection chamber 39 is arranged either in a threaded spark plug well 40 in which the metal base 4 is screwed by means of the base threading 5, or on the outer periphery of said metal base 4, or both in said well 40 and on said periphery of said base 4, said annular chamber 39 communicating with the lamination cavity 15 via at least one gas injection channel 41 arranged approximately radially in the metal base 4, or possibly tangentially to the latter.

It will be noted that, as another variant of the spark plug with shuttle electrode 1 according to the invention, the lamination cavity 15 is arranged inside the ceramic insulator 3. Alternatively, said cavity 15 can be coated with a thermally insulating and/or refractory material.

It will be noted that the main innovative components of the spark plug with shuttle electrode 1 according to the invention, such as the shuttle electrode 20, the cavity-side shuttle electrode abutment 23 or the chamber-side shuttle electrode abutment 24, may be housed in a base added in the cylinder head 10 in which the metal base of a conventional spark plug devoid of a ground electrode facing its central electrode is screwed.

Operation of the Invention

The operation of the spark plug with shuttle electrode 1 according to the invention is easily understood from the illustrations in FIGS. 1-21.

FIG. 1 shows that the spark plug with shuttle electrode 1 is mounted here on an internal combustion engine 2, its metal base 4 being screwed into the cylinder head 10 of said engine 2.

To detail the said operation, we will retain here the exemplary embodiment of the spark plug with shuttle electrode 1 according to the invention as illustrated in FIGS. 2-11 in which it can be seen that the shuttle electrode 20 is made of only one piece of electrically conductive material which, in this case, is a metal. According to this example, the shuttle electrode 20 can translate into an insulating sleeve 25 comprised in the lamination duct 16, which is radially interposed between the shuttle electrode 20 and the lamination duct 16, and which consists of an electrically and thermally insulating material such as a ceramic or the like.

It may be noted that the insulating sleeve 25 has three longitudinal large section channels 35 for gas passage which allow the gases to pass from the lamination cavity 15 to the combustion chamber 11 or vice versa. Said channels 35 are arranged inside said sleeve 25.

According to this nonlimiting embodiment of the spark plug with shuttle electrode 1 according to the invention, it is noted that the cavity-side shuttle electrode abutment 23 consists of a shuttle electrode closing seat 30 arranged at the end of the insulating sleeve 25, said seat 30 cooperating with a shuttle electrode closing flange 31 which the shuttle electrode 20 presents at its periphery.

It will be understood that the shuttle electrode closing seat 30 and the shuttle electrode closing flange 31 form a seal when in contact with each other so as to prevent any gas from passing through at said point of contact when the pressure in the combustion chamber 11 is greater than that prevailing in the lamination cavity 15.

Still according to this exemplary embodiment, it will also be noted that the chamber-side shuttle electrode abutment 24 consists of a shuttle electrode opening seat 32, also provided in the insulating sleeve 25, said seat 32 cooperating with a shuttle electrode opening flange 33 provided by the shuttle electrode 20 at its periphery and/or at its end.

It should be noted that the shuttle electrode opening seat 32 and the shuttle electrode opening flange 33 form a seal when in contact with each other so as to prevent any gas from passing through said contact.

It should also be noted that according to the particular embodiment of the spark plug with shuttle electrode 1 according to the invention considered here to illustrate its operation, the shuttle electrode closing flange 31 and the shuttle electrode opening flange 33 are combined to form together one single closing-opening flange 36. This is particularly visible in FIGS. 2-8, and FIGS. 10 and 11.

It will also be noted in FIGS. 3, 6-8, and 10 that when the closing-opening flange 36 is in contact with the shuttle electrode opening seat 32 with which it cooperates, it defines with the insulating sleeve 25 a torch ignition prechamber 37 which communicates simultaneously with the lamination cavity 15 on the one hand, and with the combustion chamber 11 via eight gas ejection orifices 38 on the other hand.

According to this particular example, we will assume that the diameter of said orifices 38 is fifteen hundredths of a millimeter.

As is particularly illustrated in FIGS. 2-11, in order to receive the torch ignition prechamber 37, the insulating sleeve 25 is extended by a protruding ejection dome 47 inside which said prechamber 37 is arranged. As illustrated, said dome 47 protrudes from the metal base 4 and the gas ejection orifices 38 open out of said dome 47.

As seen in FIGS. 2-11, the protruding ejection dome 47 is an element added to the insulating sleeve 25 which is also made of a thermally insulating and refractory material, while the shuttle electrode opening seat 32 is actually arranged in said dome 47.

It will be noted that the inner peripheral wall of the torch ignition prechamber 37 is cylindrical while the closing-opening flange 36 is housed at a low radial clearance—for example five hundredths of a millimeter—in said prechamber 37 so as to leave a small radial clearance between said flange 36 and said wall regardless of the position of the shuttle electrode 20 with respect to the lamination duct 16.

Said low radial clearance forces the majority of the gases transferred from the combustion chamber 11 to the lamination cavity 15 or vice versa to pass via the gas ejection orifices 38 rather than between the inner peripheral wall of the torch ignition prechamber 37 and the closing-opening flange 36.

Figure 3:
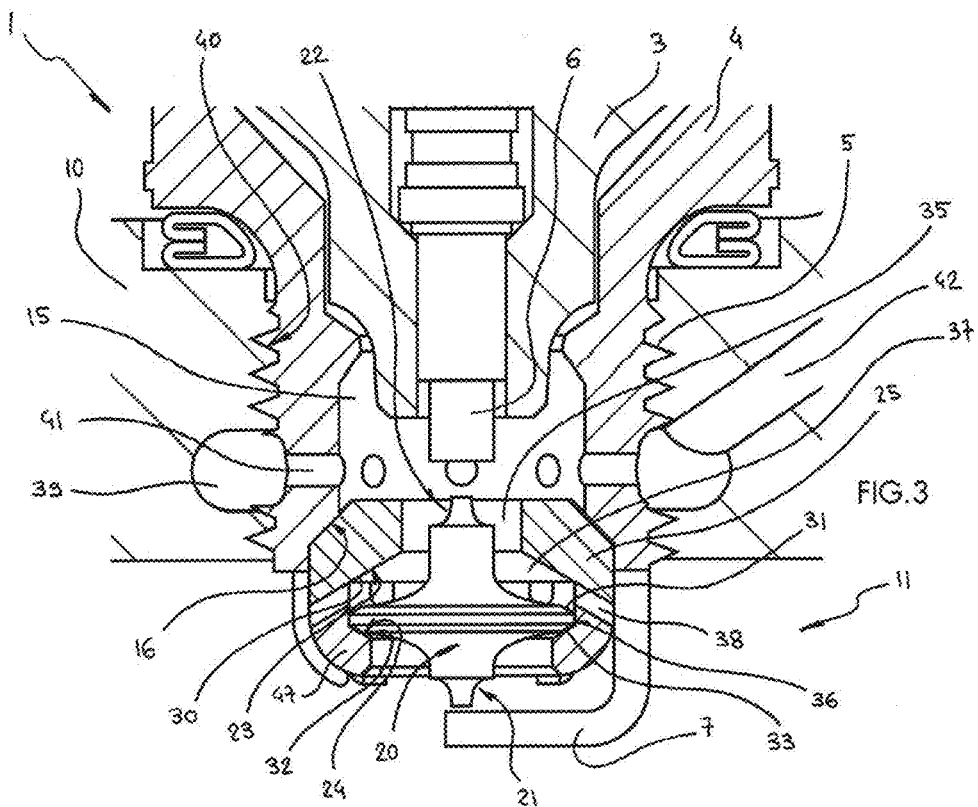
FIGS. 3-8 are partial close-up views in schematic section of the spark plug with shuttle electrode according to the invention and according to the particular configuration shown in FIG. 2, said close-up views illustrating various phases of operation of said spark plug.
Figure 4:
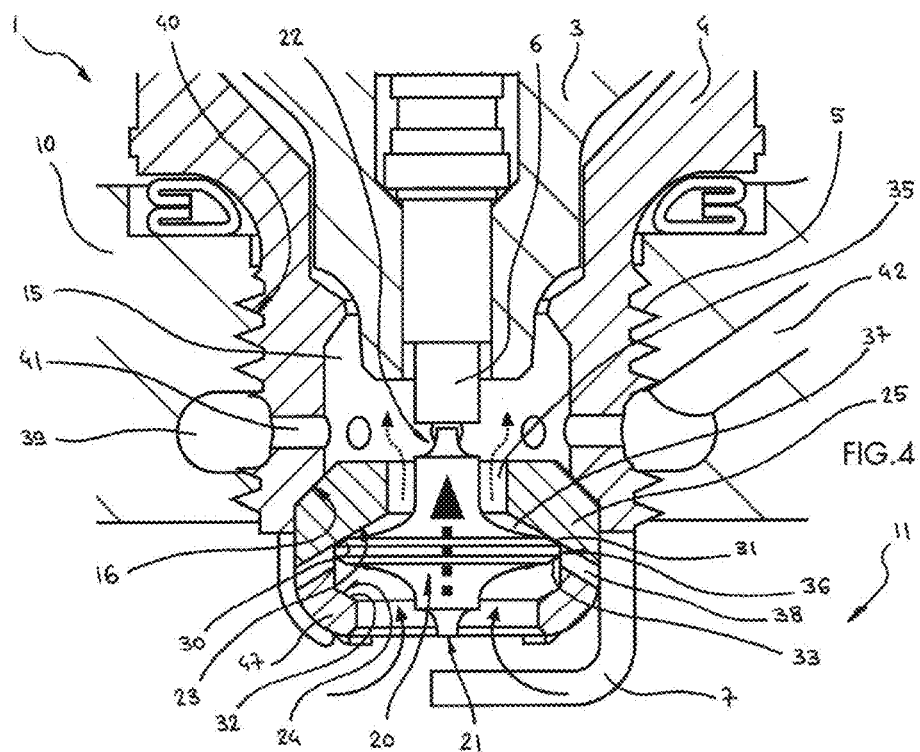
Figure 5:
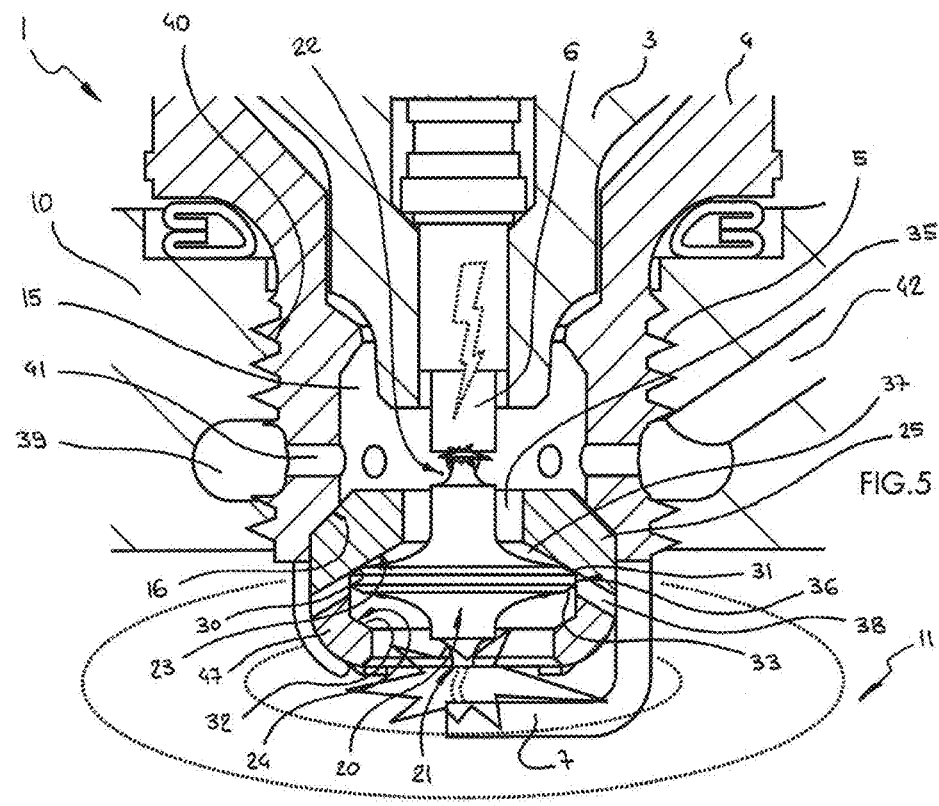

It should be noted that depending on whether the pressure in the lamination cavity 15 is lower or higher than the pressure prevailing in the combustion chamber 11, the shuttle electrode 20 can be made to position itself either on its cavity-side shuttle electrode abutment 23, as illustrated in FIGS. 4 and 5, or on its chamber-side shuttle electrode abutment 24, as illustrated in FIGS. 2 and 3, FIGS. 6-8, and FIG. 10.

In this case, and as just described, the cavity-side shuttle electrode abutment 23 is none other than the shuttle electrode closing seat 30, while the chamber-side shuttle electrode abutment 24 consists of the shuttle electrode opening seat 32.

When the shuttle electrode 20 is in contact with the cavity-side shuttle electrode abutment 23, the space left between its chamber-side end 21 and the ground electrode 7 is, in this illustrative example, of seven tenths of a millimeter while the space left between its cavity-side end 22 and the central electrode 6 is one-tenth of a millimeter.

In contrast, and as is readily conceivable, when the shuttle electrode 20 is in contact with the chamber-side shuttle electrode abutment 24, the space left between its chamber-side end 21 and the ground electrode 7 is one-tenth of a millimeter while the space left between its cavity-side end 22 and the central electrode 6 is seven tenths of a millimeter.

Thus, the total length of the electric arc—or otherwise named, spark—to be produced between the ground electrode 7 and the central electrode 6 is constant, eight tenths of a millimeter, while the distance that the shuttle electrode 20 must travel to go from one abutment 23, 24 to the other is six tenths of a millimeter.

Thus, and advantageously, the electrical voltage to be produced to create said electric arc remains constant and close to the values usually used in the context of spark plugs of positive-ignition engines, while the greatest length of said arc occurs in the combustion chamber 11 when the shuttle electrode 20 is in contact with the cavity-side shuttle electrode abutment 23, and in the lamination cavity 15 when the shuttle electrode 20 is in contact with the chamber-side shuttle electrode abutment 24.

To understand the operation of the spark plug with shuttle electrode 1 according to the invention, it is useful to break down the operation into the four stages of the internal combustion engine 2.

In a first stage, we will consider that said engine 2 burns a main charge 12 virtually undiluted and therefore highly burnable. The use of a pilot charge 18 is not necessary which avoids having to compress said pilot charge 18 and to provide a maximum efficiency to said engine 2 in this context.

With the shuttle electrode 20 in contact with the cavity-side shuttle electrode abutment 23, during the intake phase of the internal combustion engine 2, the piston 9 goes down into the cylinder 8. The volume of the combustion chamber 11 increases and the pressure prevailing in said chamber 11 decreases. A main charge 12 is introduced into the cylinder 8 via the intake duct 13 of the internal combustion engine 2 via an intake valve 45.

Thus, the pressure that prevails in the combustion chamber 11 becomes momentarily lower than that prevailing in the lamination cavity 15. As a result, the gases contained in the lamination cavity 15 exert a force on the closing-opening flange 36 which until then formed a closed contact with the shuttle electrode closing seat 30 with which it cooperates. Such a situation is illustrated in FIG. 6.

Figure 6:
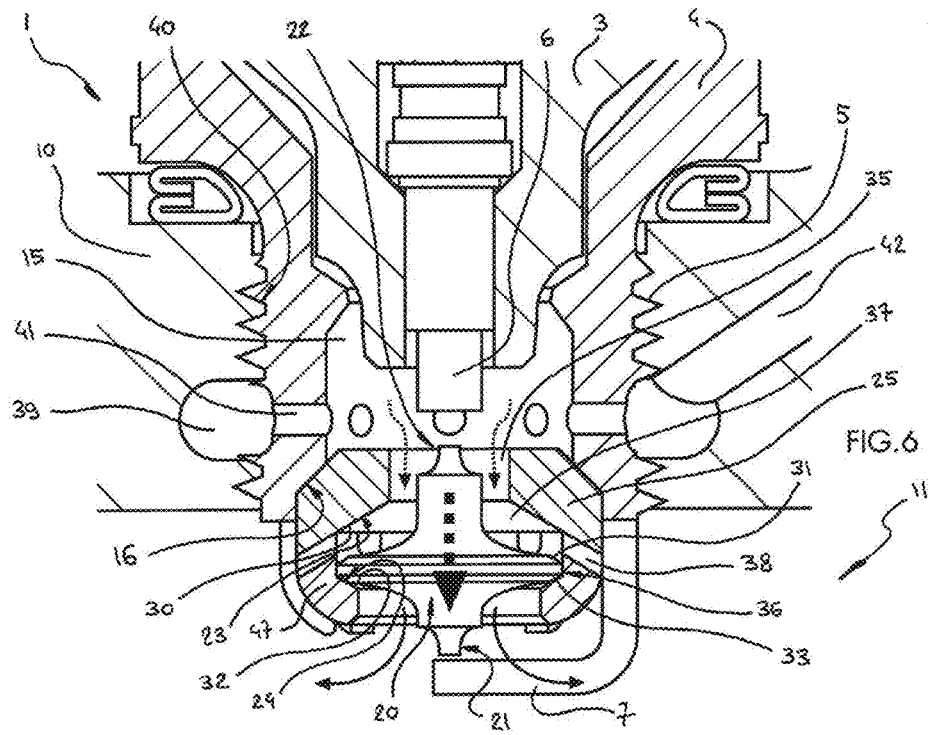

Subsequent to said force, the contact between the closing-opening flange 36 and the shuttle electrode closing seat 30 is broken and the shuttle electrode 20 moves towards the combustion chamber 11 until the closing-opening flange 36 comes into contact with the shuttle electrode opening seat 32, which is also shown in FIG. 6.

In doing so, the burnt or non-burnt gases of the preceding cycle still contained in the lamination cavity 15 escape from the latter to go towards the combustion chamber 11, mainly and respectively via the three longitudinal channels 35 for gas passage that are comprised in the insulating sleeve 25, the torch ignition prechamber 37, and the gas ejection orifices 38.

It should also have been noted that during its course, the closing-opening flange 36 has progressively opened the gas passage via the longitudinal channels 35 for gas passage by opening the gas ejection orifices 38, initially partially, then increasingly and finally completely as it moves towards the shuttle electrode opening seat 32.

The sequence that has just been described allows finding the spark plug with shuttle electrode 1 according to the invention in the situation illustrated in FIG. 3.

The piston 9 having reached its lowest dead point and the inlet valve 45 having closed, said piston 9 begins to rise in the cylinder 8 and to compress the main charge 12. The volume of the combustion chamber 11 decreases and the pressure prevailing in said chamber 11 increases to the point of becoming higher than that prevailing in the lamination cavity 15.

As a result, the gases contained in the combustion chamber 11 exert a force on the closing-opening flange 36 which until now formed a closed contact with the shuttle electrode opening seat 32 with which it cooperates. As a result, the shuttle electrode 20 moves until the closing-opening flange 36 abuts the shuttle electrode closing seat 30 to form again a closed contact therewith. This leads to the situation shown in FIG. 4.

It should be noted that in all cases, except for the brief moment during which the closing-opening flange 36 forms a closed contact with the shuttle electrode closing seat 30, it is mainly the dynamic gas pressure associated with the movement of the latter from the lamination cavity 15 to the combustion chamber 11 or vice versa, which acts on said flange 36 to drive the shuttle electrode 20 in translation.

It should be understood that the amount of gas that passes through the closing-opening flange 36 to go from the combustion chamber 11 to the lamination cavity 15 or vice versa depends on the movement of the piston 9 but also, on the one hand, on the ratio between the total volume of said gas contained in the cylinder 8 and the combustion chamber 11, and, on the other hand, on the total volume of said gas contained in the torch ignition prechamber 37, the longitudinal channels 35 for gas passage, the lamination cavity 15, the gas injection channels 41, the annular pilot charge injection chamber 39, and the injector outlet duct 42.

It should also be noted that when the closing-opening flange 36 forms a closing contact with the shuttle electrode opening seat 32 and while the pressure in the combustion chamber 11 is rising, the total section exposed by said flange 36 to the pressure of the gas contained in said chamber 11 is significantly greater than the total section of the gas ejection orifices 38. This allows producing a sufficient force on the shuttle electrode 20 to push it towards the lamination cavity 15 during the ascent of the piston 9 in the cylinder 8, at a sufficiently high speed.

The piston 9, continuing its ascent in the cylinder 8, compresses the main charge 12, which increasingly presses the closing-opening flange 36 on the shuttle electrode closing seat 30.

When the main charge 12 must be ignited, a high voltage current is applied to the central electrode 6 so that a one tenth of a millimeter electric arc is produced between said central electrode 6 and the cavity-side end 22 of the shuttle electrode 20, while a second electric arc of seven tenths of a millimeter is produced between the ground electrode 7 and the chamber-side end 21 of the shuttle electrode 20. This situation is shown in FIG. 5.

The burnable gases that may be present in the lamination cavity 15 are not ignited because the distance between the central electrode 6 and the cavity-side end 22 of the shuttle electrode 20 is insufficient. Indeed, said distance is inferior to the thickness of the known flame-closing layer which lines the inner surface of the lamination cavity 15.

The main charge 12 itself is ignited under conditions similar to those found in any positive-ignition engine operating with a virtually undiluted and highly burnable main charge 12.

The piston 9 having crossed its top dead center, it goes down into the cylinder 8 to loosen up the constituent gases of the main charge 12 now flaming. Said piston 9 operates this descent while producing work on a crankshaft 43 comprised in the internal combustion engine 2, by means of a connecting rod 44 with which said crankshaft 43 cooperates.

As the piston 9 arrives close to its bottom dead center, the exhaust valve 46 of the internal combustion engine 2 opens up and the burnt gases start to escape from the combustion chamber 11 via the exhaust duct 14. The pressure prevailing in said chamber 11 drops sharply to the point of rapidly becoming lower than that prevailing in the lamination cavity 15.

The gases contained in the lamination cavity 15 then exert a force on the closing-opening flange 36 which until then formed a closing contact with the shuttle electrode closing seat 30 with which it cooperates.

Following this effort, and as shown in FIG. 6, the shuttle electrode 20 moves towards the combustion chamber 11 until the closing-opening flange 36 comes into contact with the shuttle electrode opening seat 32, or not, if the time left to this movement is too short because, in fact, the piston 9 having gone beyond its bottom dead center, it begins to expel the burnt gases from the combustion chamber 11 via the exhaust duct 14.

During the exhaust stroke of the piston 9, it is understood that the gas pressure will substantially go up in the combustion chamber 11 to the point that the shuttle electrode 20 can move back towards the lamination cavity 15 and do so until the closing-opening flange 36 comes into contact, or not, with the shuttle electrode closing seat 30. This situation, which can occur in all or part, is illustrated in FIG. 4.

Once the piston 9 has reached its top dead point at the end of the exhaust stroke, the internal combustion engine 2 can perform a new four-stroke thermodynamic cycle whose ignition is understood to be produced by the spark plug with shuttle electrode 1 according to the invention under conditions similar to those found in all said positive-ignition engines 2 equipped with a conventional spark plug, and operating a main charge 12 hardly diluted, or not at all, and therefore highly burnable.

The advantages of the spark plug with shuttle electrode 1 according to the invention are significant only when the main charge 12 is highly diluted, for example with cooled recirculated exhaust gases called "cooled EGR". Indeed, the resulting gas mixture is more resistant to ignition and is in no way conducive to rapid development of its combustion in the three-dimensional space of the combustion chamber 11.

Under such conditions, the use of a pilot charge 18 is recommended provided that said charge 18 is effective not only in initiating combustion, but also in developing said combustion in the shortest possible time, these two objectives being directly served by the spark plug with shuttle electrode 1 according to the invention.

According to the non-limiting example of embodiment of the spark plug with shuttle electrode 1 considered here to illustrate the operation, we will assume that the pilot charge 18 contains one percent of the fuel contained in the main charge 12.

As described previously, the shuttle electrode 20 being in contact with the cavity-side shuttle electrode abutment 23, during the intake phase of said engine 2, the piston 9 goes down into the cylinder 8.

The volume of the combustion chamber 11 increases and the pressure prevailing in said chamber 11 decreases. A main charge 12 strongly diluted with the cooled EGR is introduced into the cylinder 8 through the intake valve 45 via the intake duct 13 of the internal combustion engine 2.

As described previously, the pressure in the combustion chamber 11 becomes momentarily lower than that prevailing in the lamination cavity 15. As a result, the gases contained in the lamination cavity 15 exert a force on the closing-opening flange 36 which until then formed a closed contact with the shuttle electrode closing seat 30 with which it cooperates.

Following this occurrence, and as shown in FIG. 6, the contact between the closing-opening flange 36 and the shuttle electrode closing seat 30 is broken and the shuttle electrode 20 moves towards the combustion chamber 11 until the closing-opening flange 36 comes into contact with the shuttle electrode opening seat 32.

In doing so, the burnt or non-burnt gases of the preceding cycle still contained in the lamination cavity 15 escape from the latter to go towards the combustion chamber 11, respectively via the three longitudinal channels 35 for gas passage comprised in the insulating sleeve 25, the torch ignition prechamber 37, and the eight gas ejection orifices 38.

The piston 9 having reached its bottom dead center and the inlet valve 45 having closed, said piston 9 begins to climb back into the cylinder 8 and to compress the main charge 12 strongly diluted with the cooled EGR. The volume of the combustion chamber 11 decreases and the pressure in said chamber 11 rises to the point of becoming higher than that prevailing in the lamination cavity 15.

As a result, the gases contained in the combustion chamber 11 exert a force on the closing-opening flange 36, which until now formed a closed contact with the shuttle electrode aperture seat 32 with which it co-operates. As a result, and as illustrated in FIG. 4, the shuttle electrode 20 moves rapidly until the closing-opening flange 36 abuts the shuttle electrode closing seat 30 to form a new closed contact with the latter.

As the piston 9 continues to rise in the cylinder 8, the pressure prevailing in the combustion chamber 11 continues to rise while the pressure prevailing in the lamination cavity 15 no longer rises and retains the value it had when the closing-opening flange 36 abuts the shuttle electrode closing seat 30 to form a tight contact therewith.

The lamination cavity 15 now forms a protected volume in which the gases contained in the combustion chamber 11 can no longer penetrate.

It is from this moment that the lamination injector 17 begins to inject a pilot charge 18 consisting of an easily flammable combustive-AF fuel mixture into the lamination cavity 15, via the injector outlet duct 42, and via the annular pilot charge injection chamber 39 arranged in the threaded spark plug well 40.

As can be seen in FIGS. 2 to 12, this is made possible by the fact that the annular pilot charge injection chamber 39 communicates with the lamination cavity 15 by means of—according to this nonlimiting example—eight channels of gas injection 41 arranged radially in the metal base 4 at the level of the annular pilot charge injection chamber 39.

As the lamination cavity 15 initially forms a closed and protected volume, the highly flammable combustive-AF fuel mixture that makes up the pilot charge 18 is not diluted with the low-flammability gases because it is highly diluted with cooled EGR that makes up the main charge 12.

Only the residual EGR-diluted gases that were introduced into the lamination cavity 15 remain before the closing-opening flange 36 comes into abutment on the shuttle electrode closing seat 30, said diluted gases representing only a few percent of the pilot charge 18.

It will be noted that the beginning of the injection of the pilot charge 18 into the lamination cavity 15 by the lamination injector 17 was triggered on the command of a management computer (not shown) of the internal combustion engine 2, taking into account the dynamics and the flow rate of said injector 17, and so that the pressure in said cavity 15 becomes greater than that prevailing in the combustion chamber 11, only a few degrees of rotation of the crankshaft 43, before the ignition of the main charge 12.

When the pressure prevailing in the lamination cavity 15 actually becomes greater than that prevailing in the combustion chamber 11, a force is exerted on the closing-opening flange 36 by the gases mainly consisting of an easily flammable combustive-AF fuel mixture.

As a result, said flange 36 moves rapidly towards the combustion chamber 11 to abut on the shuttle electrode opening seat 32 and to form a closed contact therewith. This situation is clearly illustrated in FIG. 7.

During its displacement, the closing-opening flange 36 let out a small portion of the easily flammable combustive-AF fuel mixture, which constitutes the pilot charge 18, mainly via the gas ejection orifices 38.

Once in contact with the shuttle electrode opening seat 32, said flange 36 effectively moved the cavity-side end 22 of the shuttle electrode 20 seven-tenths of a millimeter from the central electrode 6 so that a high-voltage current can now be applied to the central electrode 6 so that a seven-tenths of a millimeter electric arc is produced between said central electrode 6 and the cavity-side end 22 of the shuttle electrode 20, while a second one-tenth of a millimeter electric arc is produced between the ground electrode 7 and the chamber-side end 21 of the shuttle electrode 20. This situation is illustrated in FIG. 8.

Given that the pilot charge 18 is locally subjected to the heat of the spark thus created and because it consists mainly of a highly flammable combustive-AF fuel mixture, it ignites rapidly as the pressure rises violently in the lamination cavity 15 and in the annular pilot charge injection chamber 39 at several bars above the pressure prevailing at the same time in the combustion chamber 11.

Figure 7:
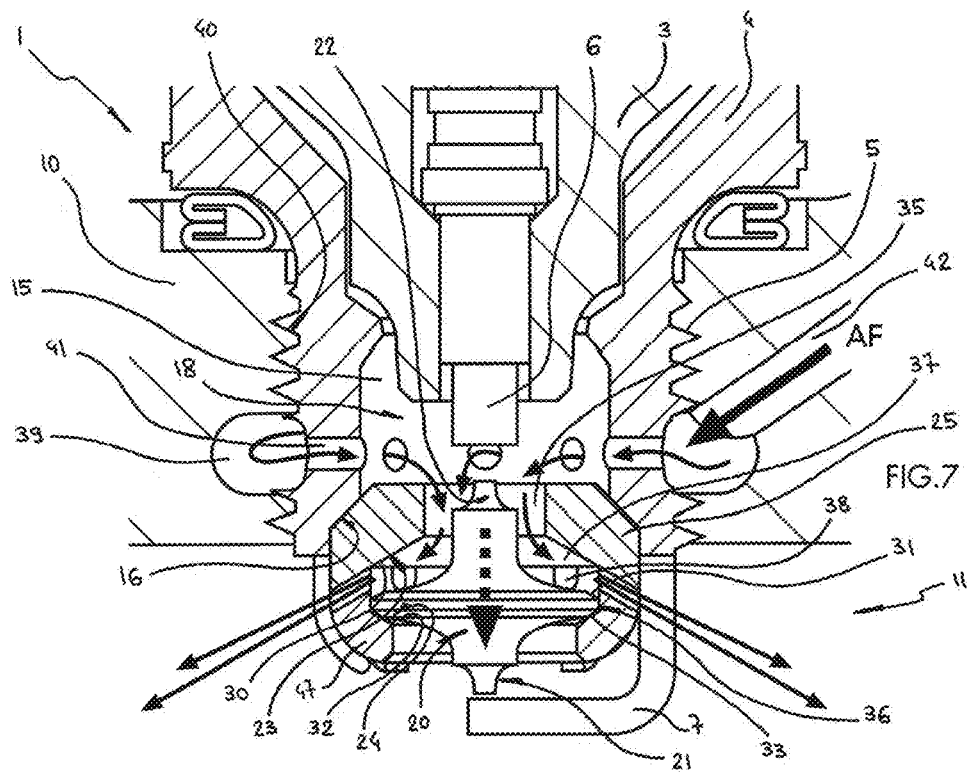

As a result, an additional unburned fraction of the pilot charge 18 is ejected into the combustion chamber 11 via the eight gas ejection orifices 38, the said fraction being immediately followed by flaming gas torches that ignite it, said torches also igniting the portion of the constituent gases of the pilot charge 18 which was ejected via the gas ejection orifices 38 before the spark was triggered, as shown in FIG. 7.

This particular configuration offers several advantages, all benefiting the most effective ignition of the main charge 12 with the pilot charge 18, the latter being the smallest possible to minimize the energy cost of compression, especially by means of the lamination compressor 19.

Firstly, and as we have seen above, the spark plug with shuttle electrode 1 according to the invention allows avoiding any excessive dispersion of the pilot charge 18 in the main charge 12 during the injection of said pilot charge 18 and before the ignition of the latter.

Then, the spark plug with shuttle electrode 1 according to the invention allows, for a few microseconds, a portion of the pilot charge 18 to penetrate into the main charge 12 to enrich it very locally in the easily flammable combustive-AF fuel mixture before igniting said portion by means of flaming gas torches. This feature allows avoiding too much heat from being transferred in vain by the flaming gases to the internal walls of the lamination cavity 15 and, in particular, to those of the longitudinal channels 35 for gas passage, the torch ignition prechamber 37 and the gas ejection orifices 38.

In addition, as clearly shown in FIG. 8, the flaming gases expelled through the eight gas ejection orifices 38 arranged radially in the protruding ejection dome 47 form flaming gas torches which ignite the main charge 12 in multiple locations of the combustion chamber 11, the combustion of said charge 12 then developing radially from the periphery of said chamber 11 to the center of said chamber 11, and tangentially between each said torch.

The strong local turbulence resulting from the penetration of said torches into the volume of the combustion chamber 11 also favors the folding of the front of the flames generated by each said torch, which further increases their effectiveness in promoting a rapid combustion of the main charge 12.

It will be noted in passing that the greater the volume of gas between the central electrode 6 and the gas ejection orifices 38 relative to the volume of gas between the outlet of the lamination injector 17 and said central electrode 6, the greater the mass of unburnt combustive-AF fuel mixture AF expelled by the gas ejection orifices 38 before the formation of torches. It is thus possible for automotive engineers to choose this ratio by appropriately adapting the relative positions and volumes of the various components of the spark plug with shuttle electrode 1 according to the invention.

It can also be noted that the spark plug with shuttle electrode 1 according to the invention makes it easy to ensure the cleanliness of the protruding ejection dome 47 even when the internal combustion engine 2 operates for a long time with an undiluted main charge 12 and, therefore, without resorting to a pilot charge 18.

Indeed, it is well known that the ceramic insulator head of the spark plugs which is introduced into the combustion chamber 11 of positive-ignition engines must maintain a temperature ideally between about four hundred degrees Celsius to burn all carbon deposits or carbonized oil, and eight hundred degrees Celsius above which there is a serious risk of uncontrolled self-ignition of the main charge 12.

It is therefore observed that, according to the particular configuration of the spark plug with shuttle electrode 1 according to the invention which has just been taken as an example to illustrate its operation, it is the protruding ejection dome 47 which can become fouled due to low temperature, or cause uncontrolled self-ignition of the main charge 12 due to excessive temperature.

The fouling of the closing-opening flange 36 does not pose any particular problem in that said flange 36 heats up to a high temperature when it is licked by the flaming gases exiting from the lamination cavity 15 or entering into the latter, then cools once the combustion of the main charge 12 is completed by resting several times on the shuttle electrode closing seat 30 with which it cooperates.

When the combustion of the main charge 12 does not require a pilot charge 18, the spark plug with shuttle electrode 1 according to the invention behaves rather like a "cold" spark plug, the protruding ejection dome 47 being directly in contact with the metal base 4 which is itself in contact with the cylinder head 10 which is usually maintained at around one hundred and ten degrees Celsius when the internal combustion engine 2 has reached its nominal operating temperature.

It should be noted that an air gap may be left between a portion of the insulating sleeve 25 and the lamination duct 16 so as to limit the heat exchanges between said sleeve 25 and said duct 16. This allows adjusting the average temperature of the protruding ejection dome 47.

Alternatively, it is possible to thermally clean the protruding ejection dome 47 by regularly injecting pilot charges 18 by means of the lamination injector 17, which increases the temperature of said dome 47 until cleaning is achieved.

In contrast, and if this is justified, it is also possible to reduce the temperature of the protruding ejection dome 47 by, for example, carrying out injections of air alone in the lamination cavity 15, for example during the admission or exhaust phases of the internal combustion engine 2.

The decisive role of the shuttle electrode 20 in limiting the ignition voltage should be of interest. Indeed, a high ignition voltage greatly reduces the service life of the spark plugs, especially from the corrosion of the electrodes that they contain. In addition, such a voltage calls for massive insulators which are difficult to house and which are prone to breaking under the effect of temperature.

Now, all other things being equal, the necessary ignition voltage is approximately proportional to the length of the inter-electrode space, whereas the higher the density of the gas between said electrodes, the higher said voltage must be.

Therefore, it is easy to understand the difficulty related to the strategy of cooled EGR which is particularly recommended for supercharged positive-ignition engines, for example by turbocharger, and which advantageously allows increasing the volumetric ratio of said engines and therefore their average efficiency, with the counterpart of increasing the pressure of the main charge 12 at the time of its ignition.

This leads to a high density of gas between the electrodes which calls for narrowing the distance between the latter to avoid using too high an ignition voltage.

However, since the shuttle electrode 20 moves to alternatively let the greatest length of spark either in the lamination cavity 15 or in the combustion chamber 11, the total length of said spark remains invariably limited to eight tenths of a millimeter, according to the example used here to illustrate the operation of the spark plug with shuttle electrode 1 according to the invention.

The resulting inter-electrode space is always sufficient since, if the engine operates a main charge 12 that is highly diluted with cooled EGR, the spark plug with shuttle electrode 1 according to the invention uses a pilot charge 18 consisting of a highly flammable combustive-AF fuel mixture, while if the main charge 12 is not diluted, the inter-electrode space remains in accordance with the technical rules usually retained by those skilled in the art.

Thus, the shuttle electrode 20 provides two separate ignition locations—in this case, the lamination cavity 15 and the combustion chamber 11—without the need to provide either a dual ignition system each with its coil and its conductive wires that would become difficult to accommodate, or an increased total inter-electrode space that would require a high ignition voltage.

The choice of one or the other takes place automatically depending on whether the lamination injector 17 injects or not a pilot charge 18 into the lamination cavity 15.

It should also be noted that the spark plug with shuttle electrode 1 allows the internal combustion engine 2 to operate normally, as all said engines 2 operating a main charge 12 undiluted with cooled EGR in case of failure of the lamination compressor 19, the lamination injector 17 or any element that would allow supplying the lamination cavity 15 with a highly flammable combustive-AF fuel mixture.

In this case, the ignition of the main charge 12 is no longer generated through any "passive" prechamber whatsoever—this type of prechamber not being suitable for automobile engines operating at infinitely variable speed and charge—but through protruding electrodes compatible with the direct injection of gasoline, and whose operation is similar to that of ordinary mass-produced and mass-marketed spark plugs in the automotive industry.

The variant embodiment of the spark plug with shuttle electrode 1 according to the invention, shown in FIGS. 2-11, was chosen as an example to illustrate its operation. It should be noted that another embodiment of said spark plug 1, shown in FIGS. 12-21, is based on similar principles and that the explanation that has just been given can easily be adapted to said FIGS. 12-21 which are classified in the same relative order in terms of said operation.

The possibilities of the spark plug with shuttle electrode 1 according to the invention are not limited to the applications which have just been described. It should also be understood that the foregoing description was given by way of example only and does not limit the scope of said invention, in which the replacement of any element of the description by any other equivalent element must not be interpreted as exceeding that scope.

The invention claimed is:

1. A spark plug with shuttle electrode (1) for an internal combustion engine (2), said spark plug (1) comprising at least electrodes (6, 7) and a ceramic insulator (3) housed in a metal base (4) which has a base threading (5), said spark plug (1) also comprising a lamination cavity (15) connected to a combustion chamber (11) included in the internal combustion engine (2) through a lamination duct (16) while a lamination injector (17) can directly or indirectly inject into said cavity (15) a pilot charge (18) previously pressurized, said charge (18) consisting of an combustive-AF fuel mixture easily ignited by a spark, further comprising:
at least one central electrode (6) which opens into the lamination cavity (15);
at least one shuttle electrode (20) which is wholly or partly made of an electrically conductive material and which is partially or entirely housed with a small clearance in the lamination duct (16), said shuttle electrode (20) being interposed between the central electrode (6) and a ground electrode (7) and having both a chamber-side end (21) which faces the ground electrode (7) and which is exposed to the pressure prevailing in the combustion chamber (11) as well as a cavity-side end (22) which faces the central electrode (6) and which is exposed to the pressure prevailing in the lamination cavity (15), said shuttle electrode (20) capable of translating into said duct (16) under the effect of the gas pressure either towards the lamination cavity (15) when the pressure in the latter is lower than the pressure prevailing in the combustion chamber (11), or towards the combustion chamber (11) when the pressure in the latter is lower than the pressure prevailing in the lamination cavity (15);
At least one cavity-side shuttle electrode abutment (23) which determines the position of the shuttle electrode (20) closest to the lamination cavity (15);
At least one chamber-side shuttle electrode abutment (24) which determines the position of the shuttle electrode (20) closest to the combustion chamber (11).

2. The spark plug with shuttle electrode according to claim 1, wherein the shuttle electrode (20) closes all or part of the lamination duct (16) when it is closest to the lamination cavity (15) while opening said duct (16) over a wider section when it is positioned closest to the combustion chamber (11).

3. The spark plug with shuttle electrode according to claim 1, wherein all or part of the lamination duct (16) comprises an insulating sleeve (25) made of an electrically insulating and/or thermally insulating and/or refractory material, which is integral with said conduit (16), and which is radially and/or axially interposed between the shuttle electrode (20) and said conduit (16), said shuttle electrode (20) being able to translate inside said sleeve (25).

4. The spark plug with shuttle electrode according to claim 3, wherein the insulating sleeve (25) comprises at least one longitudinal channel (35) for gas passage which allows the gases to pass from the lamination cavity (15) to the combustion chamber (11) or vice versa, said channel (35) being able to be arranged inside and/or on the inner or outer surface of said sleeve (25).

5. The spark plug with shuttle electrode according to claim 1, wherein the shuttle electrode (20) consists of an insulating shuttle body (26) made of an electrically insulating material, said body (26) being crossed throughout its length by a conductive core (27) of which it is integral, said core (27) being made of an electrically conductive material, a first end (28) of said core (27) facing the ground electrode (7) while a second end (29) of said core (27) faces the central electrode (6).

6. The spark plug with shuttle electrode according to claim 1, wherein the cavity-side shuttle electrode abutment (23) consists of a shuttle electrode closing seat (30) arranged in the lamination duct (16) or at either end of said duct (16), said seat (30) cooperating with a shuttle electrode closing flange (31) included at the periphery and/or at the end of the shuttle electrode (20).

7. The spark plug with shuttle electrode according to claim 6, wherein the shuttle electrode closing seat (30) and the shuttle electrode closing flange (31) form a seal when in contact with each other, said seal preventing any gas from passing through at said point of contact when the pressure prevailing in the combustion chamber (11) is greater than the pressure prevailing in the lamination cavity (15).

8. The spark plug with shuttle electrode according to claim 1, wherein the chamber-side shuttle electrode abutment (24) consists of a shuttle electrode opening seat (32) arranged in the lamination duct (16) or at either end of said duct (16), or in the metal base (4), said seat (32) cooperating with a shuttle electrode opening flange (33) included at the periphery and/or at the end of the shuttle electrode (20).

9. The spark plug with shuttle electrode according to claim 8, wherein the shuttle electrode opening seat (32) and the shuttle electrode opening flange (33) form a seal when in contact with each other so as to prevent any gas from passing through said contact.

10. The spark plug with shuttle electrode according to claim 1, wherein the shuttle electrode (20) comprises guide means (34) in its periphery which hold said shuttle electrode (20) approximately centered in the lamination duct (16), and approximately in the same longitudinal orientation as said duct (16) regardless of the axial position of said shuttle electrode (20) relative to said duct (16).

11. The spark plug with shuttle electrode according to claim 1, wherein the shuttle electrode (20) comprises at least one longitudinal channel (35) for gas passage which allows the gases to pass from the lamination cavity (15) to the combustion chamber (11) or vice versa, said channel (35) being arranged inside and/or on the surface of said shuttle electrode (20) and possibly located either over the entire length of said shuttle electrode (20) while the two ends of said channel (35) open respectively at the chamber-side end (21) and at the cavity-side end (22), or over a portion only of said length while at least one of said ends of said channel (35) opens radially from the outer surface of the shuttle electrode (20).

12. The spark plug with shuttle electrode according to claim 9, wherein the cavity-side shuttle electrode abutment (23) consists of a shuttle electrode closing seat (30) arranged in the lamination duct (16) or at either end of said duct (16), said seat (30) cooperating with a shuttle electrode closing flange (31) included at the periphery and/or at the end of the shuttle electrode (20); and
wherein the shuttle electrode closing flange (31) and the shuttle electrode opening flange (33) form together a single closing-opening flange (36) which defines with the lamination duct (16)—when said closing-opening flange (36) is in contact with the shuttle electrode opening seat (32)—a torch ignition prechamber (37) which communicates simultaneously with both the lamination cavity (15) as well as the combustion chamber (11) via at least one gas ejection orifice (38).

13. The spark plug with shuttle electrode according to claim 12, wherein all or part of the lamination duct (16) comprises an insulating sleeve (25) made of an electrically insulating and/or thermally insulating and/or refractory material, which is integral with said conduit (16), and which is radially and/or axially interposed between the shuttle electrode (20) and said conduit (16), said shuttle electrode (20) being able to translate inside said sleeve (25), and wherein the torch ignition prechamber (37) is arranged inside the insulating sleeve (25).

14. The spark plug with shuttle electrode according to claim 13, wherein the insulating sleeve (25) protrudes from the metal base (4) to present a protruding ejection dome (47) from which the gas ejection orifice (38) opens.

15. The spark plug with shuttle electrode according to claim 14, wherein the protruding ejection dome (47) is an insert on the insulating sleeve (25).

16. The spark plug with shuttle electrode according to claim 14, wherein the shuttle electrode opening seat (32) is arranged in the protruding ejection dome (47).

17. The spark plug with shuttle electrode according to claim 12, wherein the inner peripheral wall of the torch ignition prechamber (37) is cylindrical while the closing-opening flange (36) is housed at low radial clearance in said prechamber (37).

18. The spark plug with shuttle electrode according to claim 6, wherein when the shuttle electrode (20) is positioned close to the combustion chamber (11), that is to say, either in the vicinity or in contact with the chamber-side shuttle electrode abutment (24) with which it cooperates, the shuttle electrode closing flange (31) uncovers at least one gas ejection orifice (38) which connects the lamination cavity (15) with the combustion chamber (11).

19. The spark plug with shuttle electrode according to claim 1, wherein the lamination injector (17) can directly or indirectly, via an injector outlet duct (42), inject the pilot charge (18) into the lamination cavity (15) via an annular pilot charge injection chamber (39) which is arranged either in a threaded spark plug well (40) into which the metal base (4) is screwed by means of the base threading (5), or on the outer periphery of said metal base (4), or both in said well (40) and on said periphery of said base (4), said annular chamber (39) communicating with the lamination cavity (15) via at least one gas injection channel (41) arranged approximately radially in the metal base (4).

20. The spark plug with shuttle electrode according to claim 1, wherein the lamination cavity (15) is arranged inside the ceramic insulator (3).

* * * * *